(12) United States Patent
Bingue et al.

(10) Patent No.: US 8,323,363 B2
(45) Date of Patent: Dec. 4, 2012

(54) REFORMATION OF HYDROGEN-CONTAINING FLUIDS IN A CYCLIC FLOW REACTOR

(75) Inventors: Jacques Picardy Bingue, Chicago, IL (US); Christopher Lee White, Oak Forest, IL (US); Jean Pierre-Victor, Chicago, IL (US)

(73) Assignee: Innovative Energy Solution, Crown Point, IN (US)

( * ) Notice: Subject to any disclaimer, the term of this patent is extended or adjusted under 35 U.S.C. 154(b) by 1092 days.

(21) Appl. No.: 11/847,864

(22) Filed: Aug. 30, 2007

(65) Prior Publication Data

US 2009/0062591 A1    Mar. 5, 2009

(51) Int. Cl.
 *B01J 7/00* (2006.01)
 *B01J 10/00* (2006.01)
 *C01B 3/36* (2006.01)
 *C01B 6/24* (2006.01)

(52) U.S. Cl. ............ 48/61; 422/129; 423/644; 48/197 R

(58) Field of Classification Search ....... 48/61; 423/644
See application file for complete search history.

(56) References Cited

U.S. PATENT DOCUMENTS

| | | | |
|---|---|---|---|
| 2,813,919 A | 11/1957 | Pearce | |
| 2,844,452 A | 7/1958 | Hasche | |
| 2,845,335 A * | 7/1958 | Hasche | .......................... 422/206 |
| 4,302,434 A | 11/1981 | Hellmer et al. | |
| 4,461,755 A | 7/1984 | Daley et al. | |
| 5,552,039 A | 9/1996 | McBrayer, Jr. et al. | |
| 6,458,217 B1 | 10/2002 | Li | |
| 6,517,771 B1 | 2/2003 | Li | |
| 6,521,204 B1 * | 2/2003 | Borup et al. | .................. 423/652 |
| 2002/0020113 A1 | 2/2002 | Kennedy et al. | |
| 2003/0019551 A1 | 1/2003 | Li | |
| 2004/0199039 A1 | 10/2004 | Brophy et al. | |
| 2007/0191664 A1 | 8/2007 | Hershkowitz et al. | |

OTHER PUBLICATIONS

International Search Report dated Jan. 28, 2009.
J.G. Hoffmann, R. Echigo, H. Yoshida and S. Tada, "Experimental Study on Combustion in Porous Media With a Reciprocating Flow System;" Combustion and Flame 111:32-46 (1997) The Combustion Institute Published by Elsevier Science Inc.

(Continued)

*Primary Examiner* — Matthew Merkling
(74) *Attorney, Agent, or Firm* — Reed Smith, LLP

(57) ABSTRACT

The invention discloses an apparatus and process for the reformation of hydrogen containing fluids to hydrogen and other constituents, more particularly, the reformation of hydrocarbons or mixtures of hydrocarbons in a cyclic flow inert porous media reactor for the production of hydrogen and other constituents. In an alternate embodiment, the apparatus and process can be used for the reformation of hydrogen sulfide to produce hydrogen and sulfur.

The cyclic flow reactor comprises a reaction chamber filled with a porous media matrix containing an unconstrained reaction zone located in any portion of the reactor chamber. This reactor system employs valves to canalize the reactant mixture and product mixture during flow cycling channeling the reactant mixture through the porous media matrix, and reacting the reactant mixture. In another embodiment, the reactor system may further comprise at least one aperture along the axial length of the reactor casing to enable mounting of an external energy source and/or at least one heat exchanger to provide a source of heat transfer to the inlet pipe and outlet pipe as well as the reactant mixture and product mixtures.

11 Claims, 14 Drawing Sheets

OTHER PUBLICATIONS

Fabiano Contarin, Alexei V. Saveliev, Alexander A. Fridman, Lawrence A. Kennedy; "A Reciprocal Flow Filtration Combustor With Embedded Heat Exchangers: Numerical Study;" International Journal of Heat and Mass Transfer 46 (2003) pp. 949-961.

W.M. Barcellos, A.V. Saveliev and L.A. Kennedy; "Low Emission Saturated Steam Boiler With Reciprocal Flow Inert Porous Media Combustor Operating on Ultra-Lean Natural Gas/Air Mixtures;" Energy Systems Laboratory Department of Mechanical Engineers UIC-University of Illinois at Chicago, Chicago, USA; pp. 1-15.

Marcus K. Drayton; Alexei V. Saveliev; Lawrence A. Kennedy; Alexander A. Fridman and Yao-En (David) Li; "Syngas Production Using Superadiabatic Combustion of Ultra-Rich Methane-Air Mixtures;" Twenty-Seventh Symposium (International) on Combustion/ the Combustion Institute 1998/pp. 1361-1367.

* cited by examiner

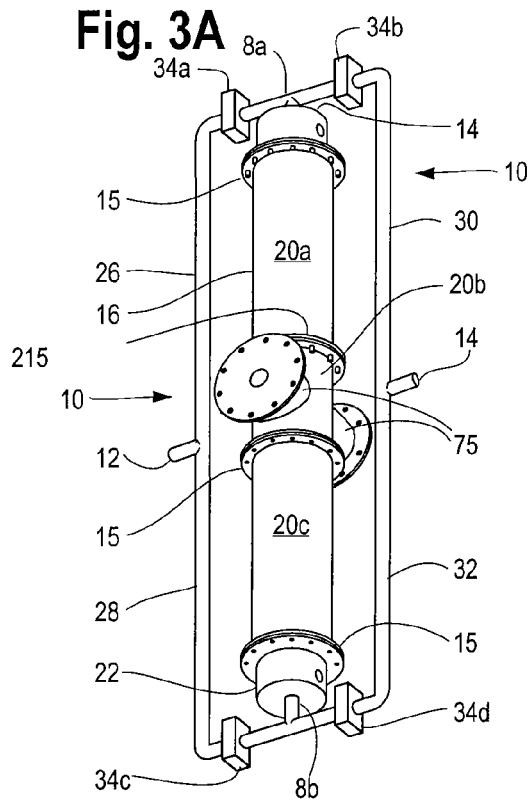
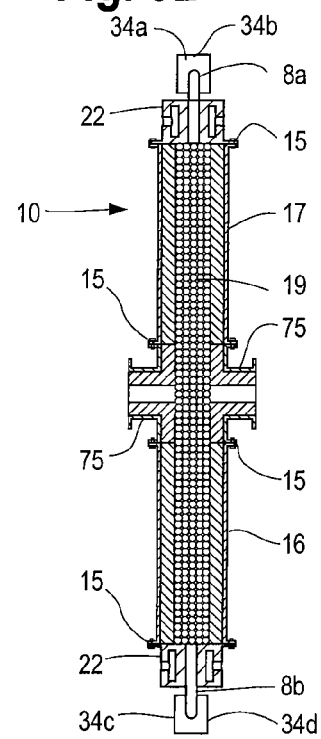
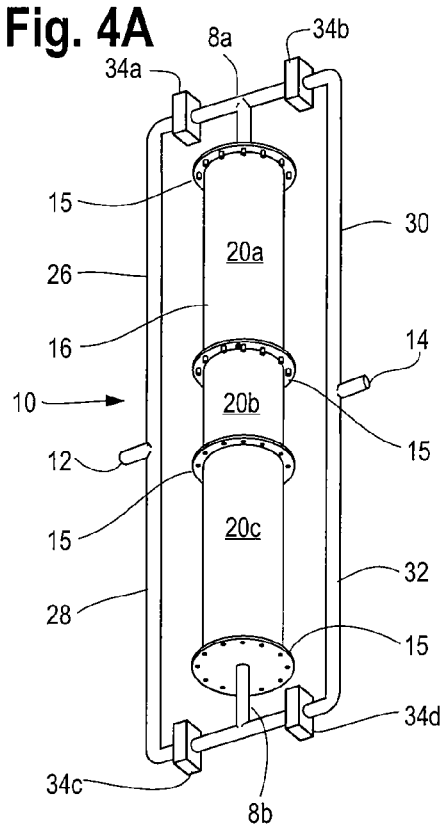
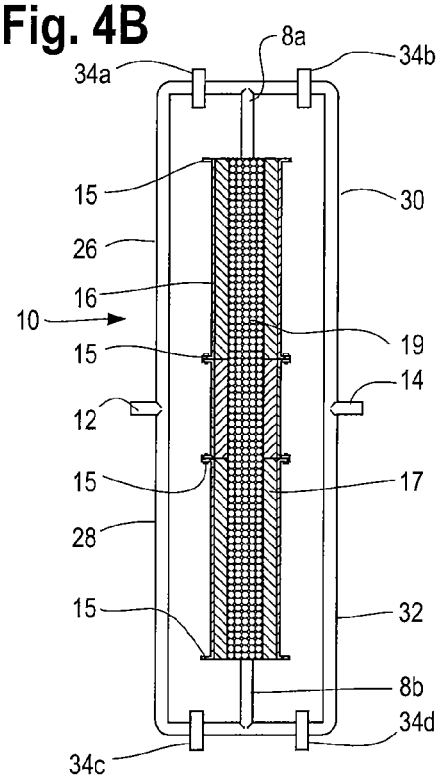

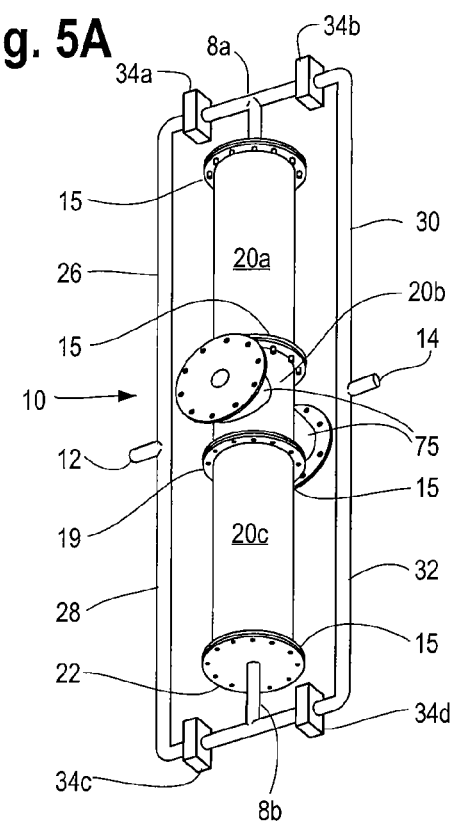
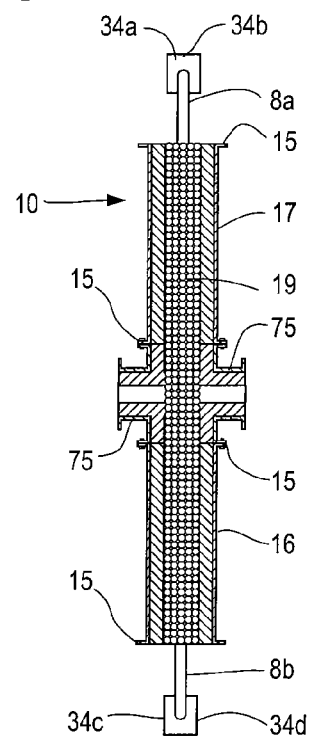
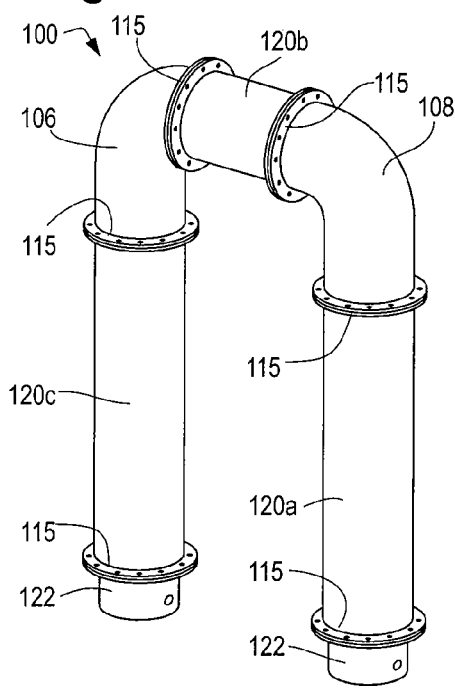
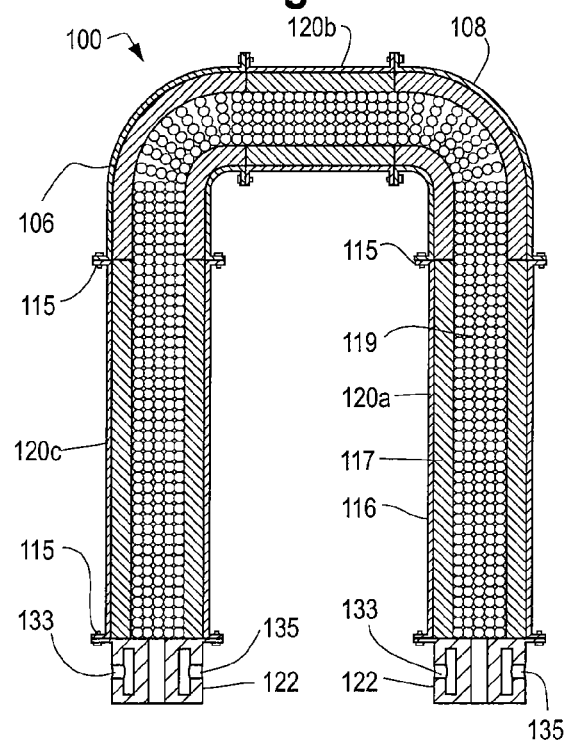

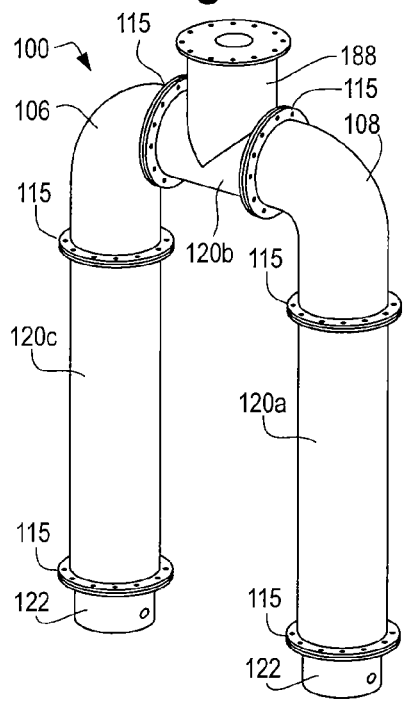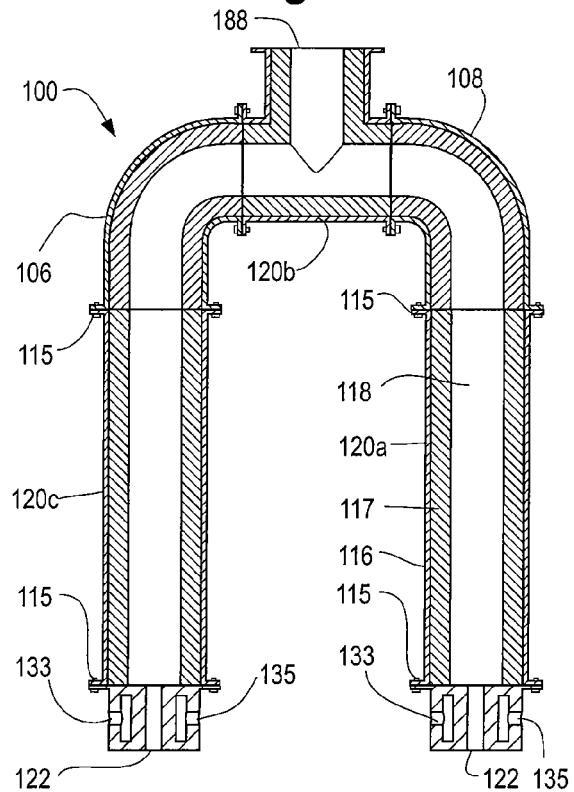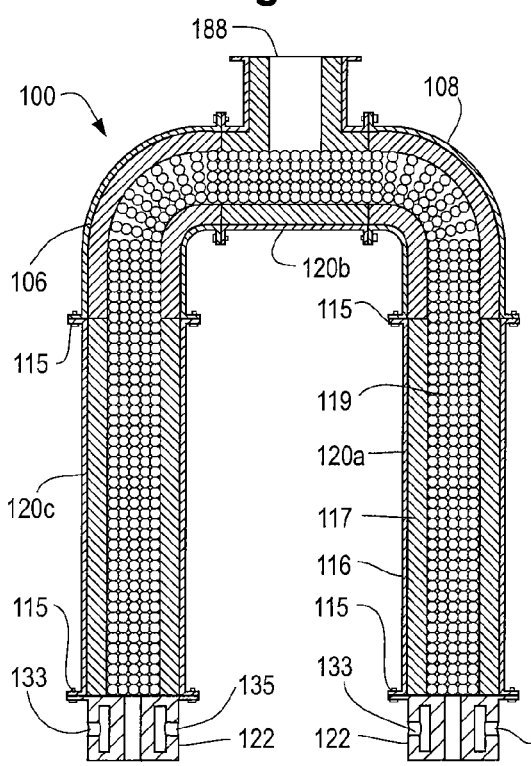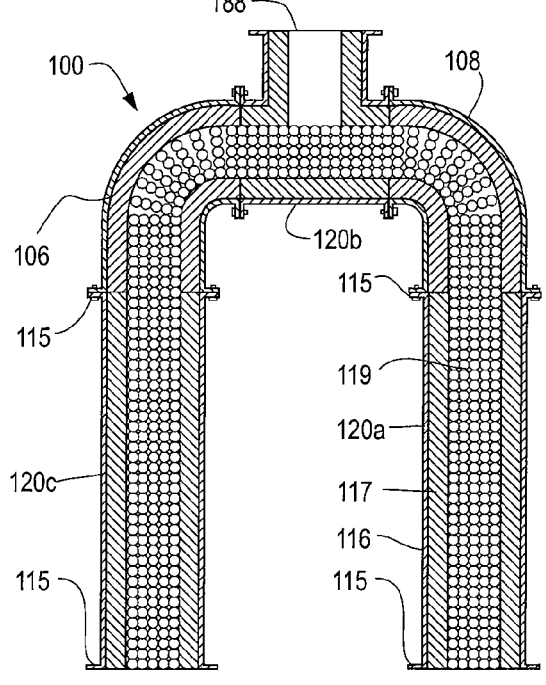

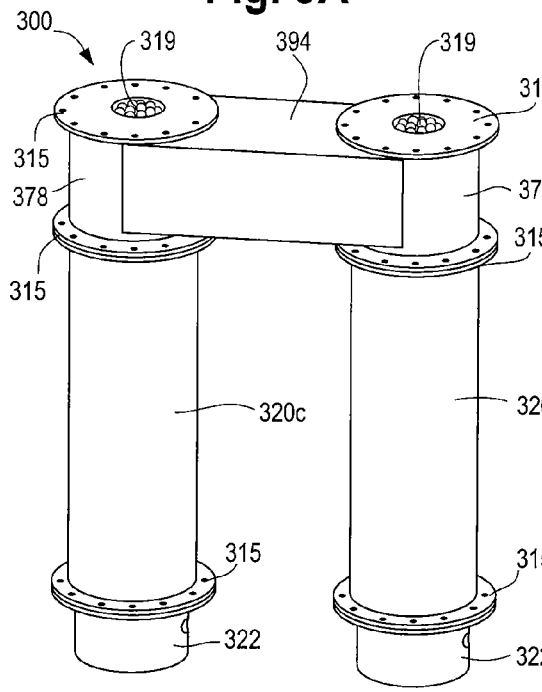
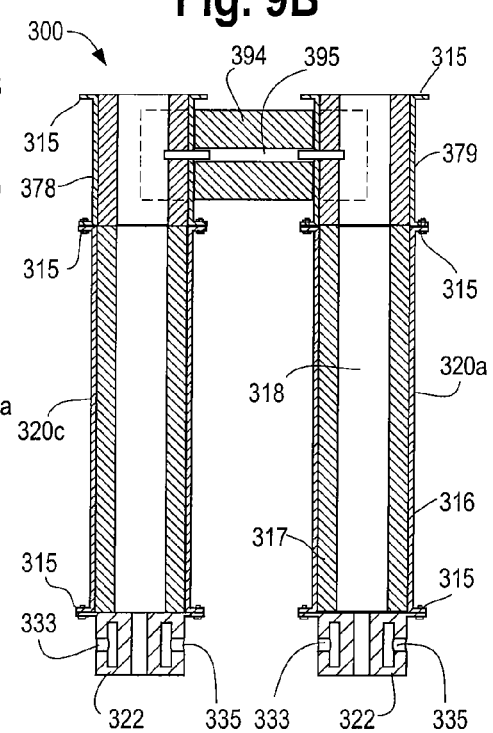
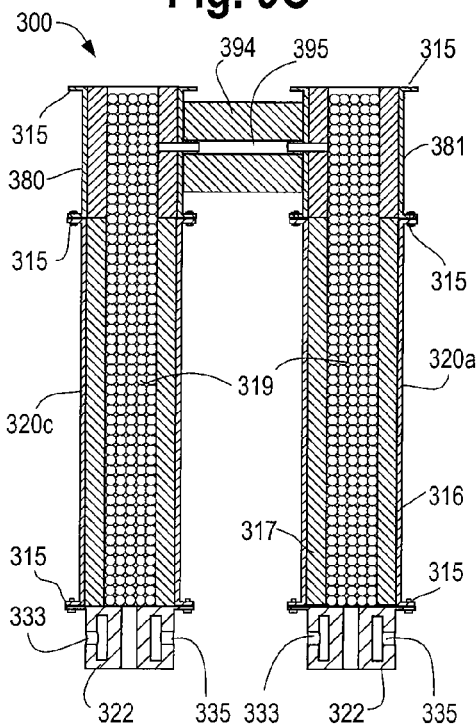
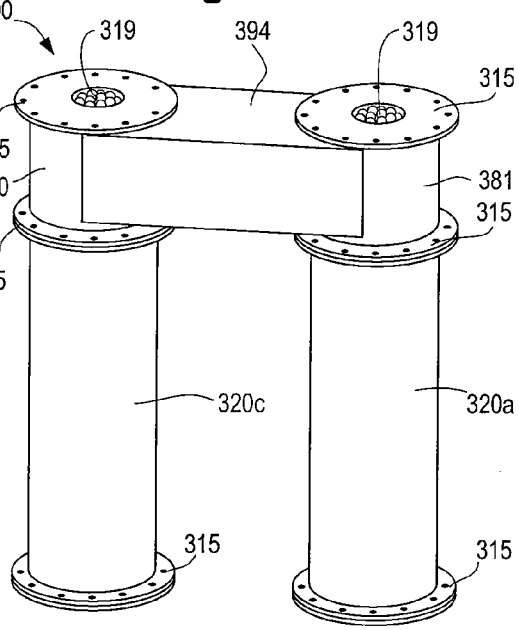

ic fluids to hydrogen and other constituents. More particularly, the invention is directed to the reformation of hydrocarbons or mixtures of hydrocarbons in a cyclic flow inert porous media reactor for the production of synthesis gas. In an alternate embodiment, the apparatus and process can be used for the reformation of hydrogen sulfide to produce hydrogen and sulfur.

REFORMATION OF HYDROGEN-CONTAINING FLUIDS IN A CYCLIC FLOW REACTOR

FIELD OF THE INVENTION

The invention discloses an apparatus and process for the reformation of hydrogen containing fluids to hydrogen and other constituents. More particularly, the invention is directed to the reformation of hydrocarbons or mixtures of hydrocarbons in a cyclic flow inert porous media reactor for the production of synthesis gas. In an alternate embodiment, the apparatus and process can be used for the reformation of hydrogen sulfide to produce hydrogen and sulfur.

BACKGROUND OF THE INVENTION

Hydrogen is an important feedstock in the manufacture of ammonia, methanol, and a variety of other chemicals; but its largest market is the crude oil processing industry. In crude oil refineries, hydrogen is used in a number of processes including hydrodesulfurization where hydrogen is reacted with sulfur containing compounds over a catalyst to form hydrogen sulfide. Hydrogen sulfide itself is already produced in great quantities during the drilling and processing of natural gas and oil. A process that can economically extract hydrogen from low value feedstocks or wastes such as hydrogen sulfide would bring tremendous benefits to the petroleum sector as this sector consumes large amounts of hydrogen.

Many processes exist for the production of hydrogen. The production of hydrogen is currently dominated by the steam reforming process where a relatively light hydrocarbon is reacted with steam inside a bed of reforming catalyst, usually nickel. Since steam reforming of hydrocarbon is endothermic, the energy to drive the reactions must be provided from an external source. In the steam reforming process, the hydrocarbon-containing stream must be free of sulfur or other contaminants such as carbon particles that can poison and deactivate the catalyst.

Another hydrogen production method is partial oxidation. In a partial oxidation reaction, a hydrogen-containing feed is reacted with an oxidizer, such as oxygen or air, in substoichiometric proportion normally referred to as a rich mixture where the equivalence ratio spans from one 1 to the upper flammability limit of the fuel being utilized as the feedstock. The equivalence ratio, defined as the stoichiometric oxidizer to fuel ratio divided by the actual oxidizer to fuel ratio, is shown in equation R1.

$$EquivalenceRatio = \left(\frac{fuel}{Oxidizer}\right)_{actual} / \left(\frac{fuel}{Oxidizer}\right)_{stoichimetry} \quad R1$$

An equivalence ratio less than unity is considered lean, also referred to as fuel-lean, since a portion of the oxidizer is leftover after all of the fuel is consumed by the oxidation reaction. Where the fuel content of the mixture lies below the lower flammability limit of the fuel used as the feedstock, the fuel and oxidizer mixture is considered ultra-lean. Conversely, fuel and oxidizer mixtures of equivalence ratio greater than unity are considered rich, also referred to as fuel-rich, since a portion of the fuel is leftover after the oxidation reaction is complete. Mixtures of equivalence ratios greater than rich mixtures, normally taken to be higher than the upper flammability limit of the fuel being utilized as the feedstock, are considered ultra-rich. Ultra-rich mixtures do not normally produce self-sustained flames without the aid of external energy sources or preheating the mixture.

Although the partial oxidation process does not need an external source of heat since it is exothermic, it is still less common than steam reforming since it is generally less efficient than steam reforming particularly at large scale. As a normally non-catalytic process, partial oxidation can utilize any hydrocarbon feeds. The steam reforming and partial oxidation processes can be combined into a single process normally referred to as an autothermal process. In the autothermal process, the energy for the reforming reactions is provided by oxidizing a small portion of the fuel inside the bed of a reforming catalyst. Due to its catalytic nature, the autothermal process falls under the same constraints as the steam reforming process in that the catalyst bed is susceptible to poisoning and deactivation by sulfur, carbon, and other poisons in the feed stream. The hydrocarbon stream must be desulfurized in a first step prior to entering the autothermal reactor. During reforming, whether by the steam reforming or autothermal process, water must be provided in excess of the stoichiometric quantity to prevent carbon formation. Additionally, excessive temperature must be prevented in the reactions to avoid sintering the reforming catalyst. Steam reforming, partial oxidation, and the autothermal process are well known methods in the industry that are practiced on industrial scales.

The invention disclosed herein can be an economical process for producing hydrogen from hydrocarbons and various other hydrogen containing fuels. U.S. Pat. No. 6,517,771 to Li, incorporated herein by reference, disclosed a reverse flow inert porous media reactor for the purpose of heat-treating metals. Li limited the reactant stream to methane and oxygen or air, and the preheater to initiate the process is located inside the porous bed. Drayton et. al 27th, International Symposium on Combustion, 27, pp. 1361-1367, 1998, incorporated herein by reference, disclosed an application of the reverse flow reactor for fuel reforming, producing synthetic gas from methane in a reactor similar to Li's. None of the disclosed references above include an external energy source for the reverse flow reactor or are applied to the reformation of hydrogen sulfide.

A number of studies in reverse flow inert porous media reactors are carried out in applications not intended for hydrogen production from hydrocarbons. Hoffman et al, Combustion and Flame, 111, pp. 32-46, 1997, incorporated herein by reference, operated a reverse flow reactor with ultra-lean air and methane mixtures for the purpose of heating fluids. Barcellos et. al. Clean Air 2003, Seventh International Conference on Energy for a Clean Environment; Lisbon, Portugal, Jul. 7-10, 2003, incorporated herein by reference, tested a reactor similar to Hoffman's for the production of saturated steam through heat exchangers protruding directly through the inert porous media and fitted at the extremities of the reactor.

Production of hydrogen from both light and heavy hydrocarbons as well as other hydrogen containing wastes such as hydrogen sulfide is not addressed in the prior art. Hydrogen is a much more valuable commodity then sulfur. A process that can economically recover the hydrogen as well as other compounds could have significant impact on the petroleum and other industries. The reformation of hydrogen sulfide ($H_2S$) to hydrogen and sulfur presents certain challenges not encountered in hydrocarbon reformation. For example, the low heat content of $H_2S$ precludes obtaining very high temperature in the partial oxidation regime. More importantly, $H_2S$ reforming requires the reaction to reach near equilibrium conditions at high temperature to obtain high yield. In the current invention, the intrinsic heat recuperating mechanism of the inert porous media matrix and the reactor's ability to create an isothermal high temperature volume render it a cost effective option for the reformation of $H_2S$ and other hydrocarbons by providing the necessary residence time and temperature without the requirement of an external energy source to be used continuously throughout the reactions.

Specifically, all of the reforming reactions in these above-mentioned prior art references occur inside a hollow chamber. None of these references disclose an apparatus and process where the reaction zone may be located in any portion of a reactor chamber, where the reaction zone is allowed to freely propagate through the reactor chamber filled with a porous media matrix and where the reforming reactions occur directly in a heated inert porous media matrix, or packed bed. Therefore, there has developed a need for a reactor which can efficiently reform both hydrocarbon and hydrogen sulfide fuels to pure hydrogen while not requiring continuous external energy to produce a viable hydrogen yield.

SUMMARY OF THE INVENTION

The present invention is a cyclic flow porous media reactor (which may comprise inert or other material, preferably inert material) and process for the reformation of hydrogen-containing fluids to hydrogen and other constituents, also known as a product mixture. More specifically, the apparatus and process reforms gaseous and liquid hydrocarbons, and/or hydrogen sulfide to hydrogen. In the present invention, a reaction zone resulting from the partial oxidation of a hydrogen-containing fuel and an oxygen-containing gas, may be located in any portion of a reactor chamber filled with a substantially porous media matrix (further defined below) and is allowed to freely propagate, or travel, through the reactor chamber. The fuel and oxygen-containing gas comprise a reactant mixture. This method of reformation of a hydrogen containing fluid inside the reactor chamber is a significant departure from the existing partial oxidation, autothermal, and steam-reforming processes that normally have a fixed reaction zone.

The cyclic flow reactor system, one embodiment of the present invention, comprises a reactor wherein the reactor further comprises a reactor casing and a reactor chamber substantially inside the reactor casing. The inner diameter of the reactor casing may be lined with a thermal insulation layer to reduce or eliminate heat dissipation. The reactor chamber of the reactor system comprises an inert porous media matrix which in the present invention can withstand high thermal cycles in the range of about 500° C. to about 3000° C. for example and without limitation. The reactor system may also include a piping network, located on a portion of the exterior of the reactor, to channel the flow of the reactant mixture and product mixture before or after the flow is in the reactor. In one embodiment, the piping network may substantially surround the reactor. In another embodiment, the reactor system may further comprise an aperture located on the reactor casing to enable mounting of an external energy source on the outside of the reactor chamber to directly provide energy to the inert porous media matrix to initiate the reactions and also provide additional energy during steady state operation if necessary. In still another embodiment, the reactor system may further comprise a heat exchanger connected to each or either end of the reactor chamber to provide a source of heat transfer to the flow of the reactant mixture and the product mixture to and from the reactor chamber.

The process of continuously reforming hydrogen containing fluids with an oxidizer in a cyclic flow reactor system generally comprises the steps of heating the reactor chamber filled with a porous media matrix to a high temperature, channeling a reactant mixture through the porous media matrix, reacting the reactant mixture wherein the reacting occurs through a reaction zone wherein the reaction zone may be located in any portion of the reactor chamber, and reversing the direction of the reactant mixture flow after a prescribed period of time wherein the current inlet of the reactor serves as the subsequent outlet and the current outlet serves as the subsequent inlet. This flow reversal is used to keep the reaction zone inside the reactor and also assists in increasing the energy efficiency of the reactor system.

In the present invention the reaction zone is unconstrained, and thus, allowed to freely propagate around the porous media matrix contained the reactor. Specifically, if the reaction zone travels in the same direction as the incoming reactant mixture, the process can affect the excess enthalpy concept by using two energy recuperation mechanisms. Without being limited to the mechanism, it is believed the reactor system works as follows. The first recuperation mechanism is set in motion when the incoming reactant mixture, e.g. the fuels and oxidizers with possible diluents, are preheated by a hot section inside the inert porous media matrix resulting from energy stored in the porous media matrix by the previous exothermic reactions. The second recuperation mechanism takes place as the reaction zone is displaced into a region that has previously been preheated by the product mixture. When these means of energy recuperation are coupled, the process can produce superadiabatic temperatures where the actual temperature can exceed the theoretical adiabatic temperature of the mixture with its associated energy content. Using these energy recuperating mechanisms and other means, partial oxidation in an inert porous media matrix can be advantageously employed to reform ultra-rich mixtures of hydrogen containing fluids with oxidizers and/or steam. Of great benefit is the ability of the apparatus and process to reform sulfur-containing hydrocarbons and other fluids. Of still greater benefit is the ability to reform fluids of low heat content, specifically hydrogen sulfide. For certain processes, such as, without limitation, the hydrocarbon process, steam can be added to the reactant mixture to produce an even greater yield of hydrogen, with higher efficiency and simultaneous mitigation of carbon in the product mixture.

The present invention promotes the partial oxidation concept where a high temperature reaction zone is established inside an inert porous media matrix. This high temperature reaction zone is unconstrained, i.e. not a specific fixed portion of the porous media matrix. The reaction zone is allowed to freely propagate the length of the reactor chamber containing the porous media matrix in three possible directions: 1) substantially countercurrent to the direction of the incoming reactant mixture, 2) standstill i.e. velocity of the reaction or flame front is zero, and 3) substantially concurrent with the direction of the incoming reactant mixture. If the fuel content in the reactant mixture is within the flammability limit, normally referred to as the upper and lower explosive limit, the reaction zone will normally travel counter to the direction of the reactant mixture flow due to radiation and conduction heat transfer. A reaction zone propagation direction opposite to the direction of the incoming reactant mixture, countercurrent propagation, is normally associated with mixtures of relatively large calorific heat strength and is usually not associated with the superadiabatic phenomena where combustion or partial oxidation temperatures are higher than the theoretical adiabatic temperature. The speed of the freely propagating flame or reaction zone is a function of the energy content of the reactant mixture and the thermophysical properties of the inert solid material used in the porous media matrix such as, without limitation, radiative emissivity, density, and heat capacity. In the rare case that the heat content of the reactant mixture is exactly at the lower or upper flammability limits and providing that external heat losses are balanced, the reaction zone will stand still, i.e. the velocity of the unconstrained reaction zone will equal 0.

For maximum efficiency in one embodiment, the fuel and oxidizer reactant mixture is rich enough such that the reaction zone propagates in the same direction as the incoming reactant mixture, referred to above as concurrent propagation. In essence, the reaction zone traveling in the same direction as the reactant mixture has two main positive effects: 1) as the hot product mixture gases travels through the inert porous media matrix, the matrix recuperates a portion of the energy liberated during the exothermic process and accumulates energy inside the porous media matrix, 2) as the reaction zone is displaced through the reactor chamber, the incoming reactant mixture is in turn pre-heated before reaching the reaction zone by the energy accumulated in the inert porous media matrix from previous exothermic reactions. In this manner, the process is much more efficient since it results in a double energy recuperation mechanism. With this intrinsic heat exchange system, actual temperatures from this exothermic process normally exceed the theoretical adiabatic temperature. Those skilled in the art normally refer to this effect as the superadiabatic phenomena. One of the advantages of this concurrent reaction zone propagation system is the ability to sustain normal combustion for mixtures where the fuel content lies below the lower flammability limit, i.e. where the fuel mixture is ultra-lean. On the other end of the spectrum, the concurrent propagation direction of the reactant mixture and the reaction zone is well suited for fuel reformation of ultra-rich mixtures where the relatively high temperatures are ideal for overcoming kinetic and thermodynamic limitations.

Even though the reaction front propagates very slowly, on the order of 0.1 mm/s, left alone, it will eventually travel out of the reactor. To prevent the reaction zone from exiting the reactor, the direction of the reactant mixtures may be periodically reversed or "cycled" where the reactor's outlet prior to flow reversal now becomes the inlet and the inlet prior to flow direction reversal is now the new outlet. Although the interchanging of the inlet and outlet of the reactor is a means of keeping the reaction zone inside the reactor, it can also play an important role in increasing the efficiency of the reactor. Such a flow reversal or cycling, which may or may not be automatic, can also be dictated by the temperature at the outlet of the reactor system. As the reaction zone carries the partial oxidation or combustion process, the porous media matrix in the post reaction zone area absorbs the energy liberated by the reaction zone. Therefore, the temperature at the outlet of the reactor system increases over a certain amount of time until the temperature at the outlet almost reaches the temperature of the reaction zone. From the point of view of efficiency, it is less advantageous to allow the outlet temperature to reach very high values since a good portion of the energy liberated by the reaction will be lost. An appropriate cyclic period can be derived such that a great portion of the axial length of the reactor chamber is approximately an isothermal volume after a number of repetitions of flow cycling. This isothermal volume is conducive to reforming reactions when the residence time inside the reactor chamber enables the reactions to approach equilibrium. A person of ordinary skill in the art will recognize that the residence time will vary for different fuels or fluids which are to be reformed.

BRIEF DESCRIPTION OF THE DRAWINGS AND OTHER FIGURES

FIG. 3A is a perspective view of another alternate design for the reactor system shown in FIG. 1A, and FIG. 1B where at least one external port is provided around the axial mid-section of the reactor to enable mounting an external energy source.

FIG. 3B is a cross-sectional view of the reactor in FIG. 3A, showing the reactor chamber filled with an inert porous media matrix.

FIG. 4A is a perspective view of an alternative design for the reactor embodiment, where the heat exchangers at the inlet and outlet of the reactor chamber are omitted.

FIG. 4B is a cross-sectional view of the reactor of FIG. 4A, showing the reactor chamber filled with an inert porous media matrix.

FIG. 5A is a perspective view of another alternate design for the embodiment of the reactor shown in FIG. 1A, having at least one external energy port and omitting the heat exchanger at the inlet and outlet of the reactor chamber.

FIG. 5B is a cross-sectional view of the reactor in FIG. 5A, showing the reactor chamber filled with an inert porous media matrix.

FIG. 6A is a perspective view of a second embodiment of the reactor system where the cyclic flow reactor has a U-shaped design.

FIG. 6B is a two-dimensional sectioned view of the U-shaped cyclic flow reactor shown in FIG. 6A.

FIG. 7A is an alternate design for the reactor embodiment shown in FIG. 6A where the reactor has a U-shaped design and includes at least one external port to enable mounting of an external energy source on the reactor system.

FIG. 7B is a cross-sectional view of the front side of the embodiment in FIG. 7A, showing the reactor with an evacuated reactor chamber.

FIG. 7C is a cross sectional view of the front side of the embodiment in FIG. 7A showing the reactor chamber filled with an inert porous media matrix.

FIG. 7D is an alternative design for the embodiment shown in FIGS. 6A and 7A where the heat exchangers at the inlet and outlet of the reactor chamber are omitted.

FIG. 9A is a perspective view of a fourth embodiment of the reactor of the present invention having a chamber at the center of a U-shaped reactor for the placement of electrodes to initiate and sustain an arc plasma and further including optional external ports to enable mounting an external energy source on the reactor system.

FIG. 9B is a cross sectional view of the front side of the embodiment in FIG. 9A showing the general placement of the electrodes inside the chamber and showing the reactor with an evacuated chamber.

FIG. 9C is a cross sectional view of the embodiment in FIG. 9A showing the general placement of the electrodes inside the chamber and showing the reactor system with the reactor chamber filled with an inert porous media matrix.

FIG. 9D is a perspective view of an alternate design for the embodiment shown in FIG. 9A where the heat exchangers at the inlet and outlet of the reactor chamber are omitted.

Figure 13A:
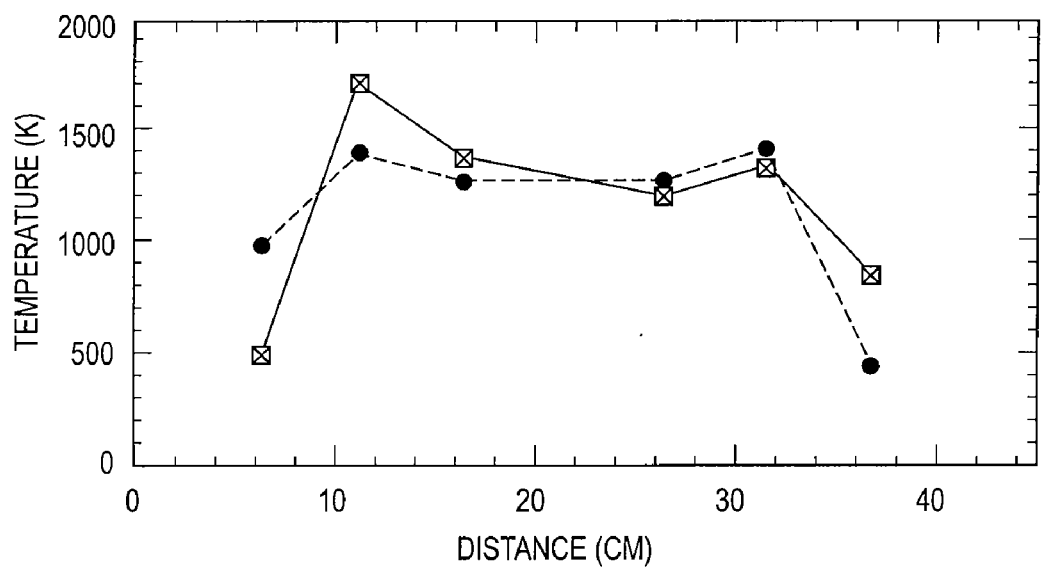

FIG. 13A is a two-dimensional graph for the temperature profile along the axial length of a cyclic flow reactor with half-cycles of about 15 minutes. The sour gas in the reactant mixture contains about 50% $H_2S$ by volume and about 50% $N_2$ by volume with air as the oxidizer and the equivalence ratio was about 3. The inert matrix was about 40% porous and composed of randomly packed alumina pellets of about 3 millimeters in diameter. The room temperature gas velocity inside the porous media was about 90 cm/s. When % or percent is used in this application, it means percent by volume unless otherwise indicated herein.

Figure 13B:
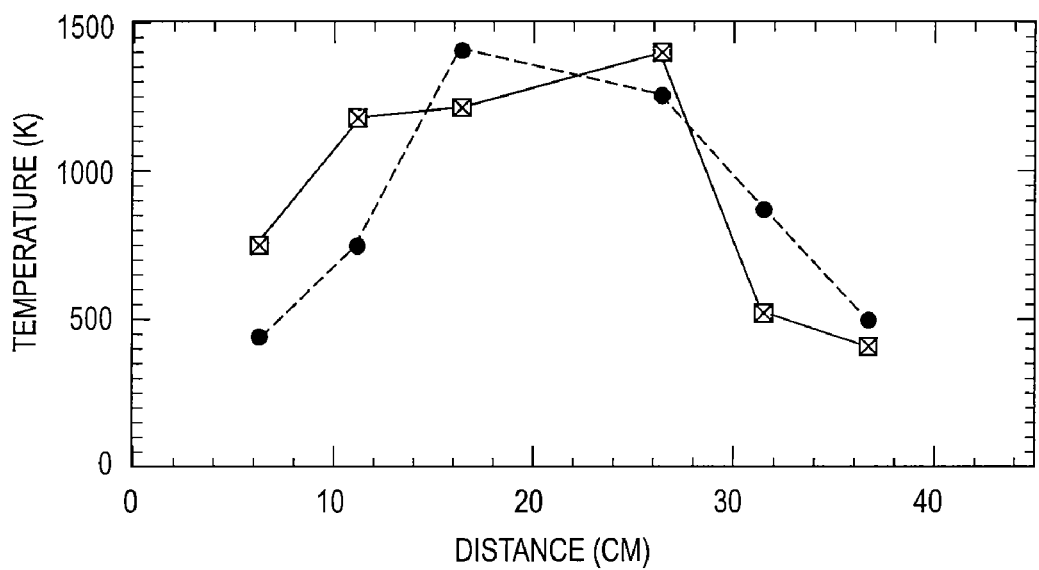

FIG. 13B is a two-dimensional graph for the axial temperature profile of a cyclic flow reactor as shown in FIG. 13A with half-cycles of about 15 minutes and an equivalence ratio of about 10.

Figure 14A:
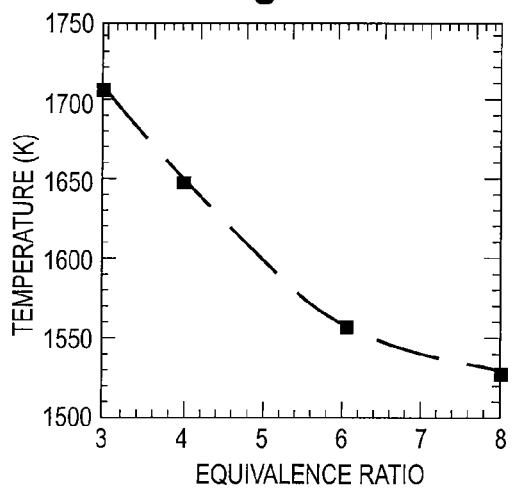

FIG. 14A is a two-dimensional graph for the maximum temperature as a function of equivalence ratio in a cyclic flow reactor after many cycles. The sour gas stream contains about 50% $H_2S$ and about 50% $N_2$ with air as the oxidizer.

Figure 14B:
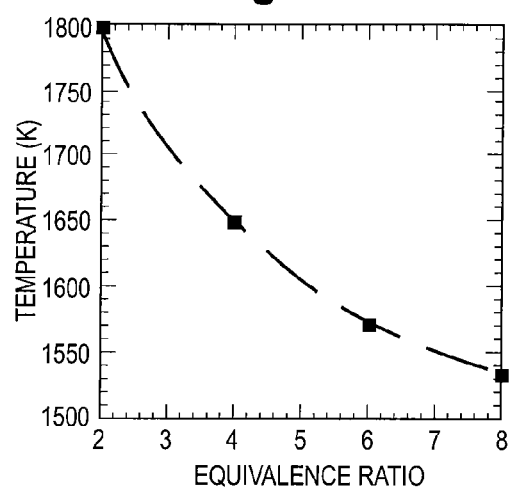

FIG. 14B is a two-dimensional graph for the maximum temperature as a function of equivalence ratio in a cyclic flow reactor after many cycles. The sour gas stream contains about 60% $H_2S$ and about 40% $N_2$ with air was the oxidizer.

Figure 14C:
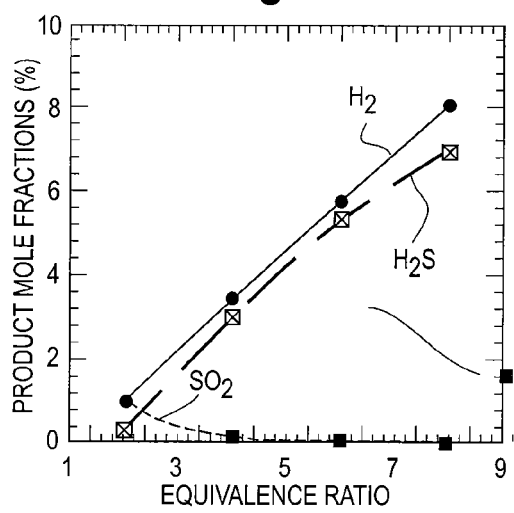

FIG. 14C is a two-dimensional graph showing concentrations of certain compounds in the product mixture stream after reformation of a dilute sour gas stream containing about 60% $H_2S$ and about 40% $N_2$ with air as the oxidizer.

Figure 14D:
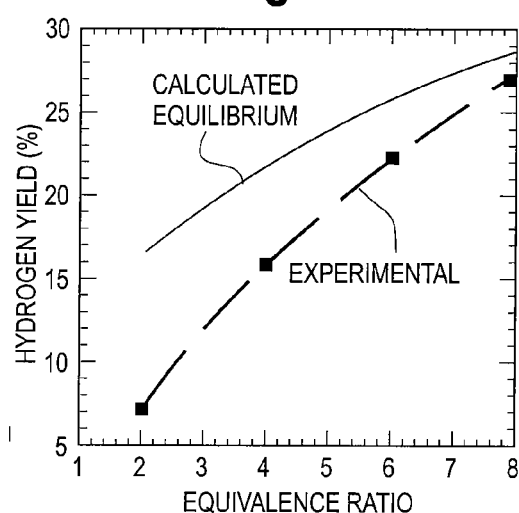

FIG. 14D is a two-dimensional graph showing experimental and calculated equilibrium yield of hydrogen for the process conditions described in FIGS. 14B and 14C.

Figure 15A:
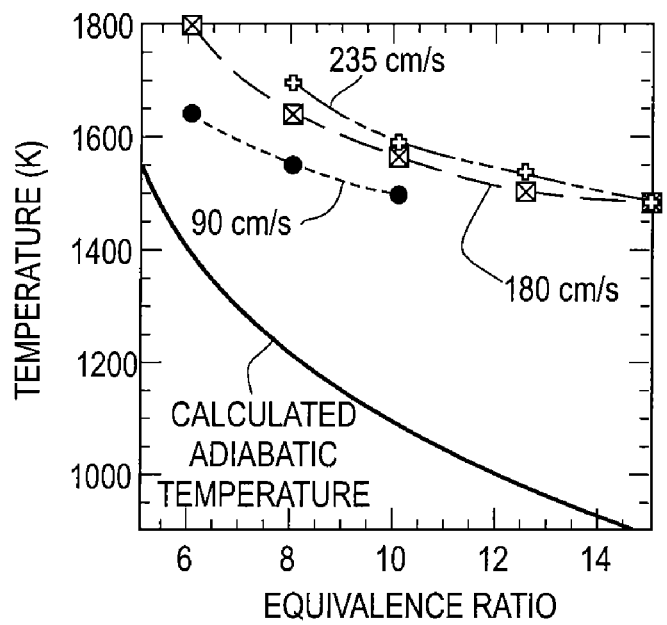

FIG. 15A is a two-dimensional graph showing the maximum temperature as a function of equivalence ratio for a cyclic flow reactor after many cycles. The sour gas stream contains about 50% $H_2S$ and about 50% $N_2$ with relatively pure oxygen as the oxidizer. The theoretical calculated adiabatic temperature is shown for reference.

Figure 15B:
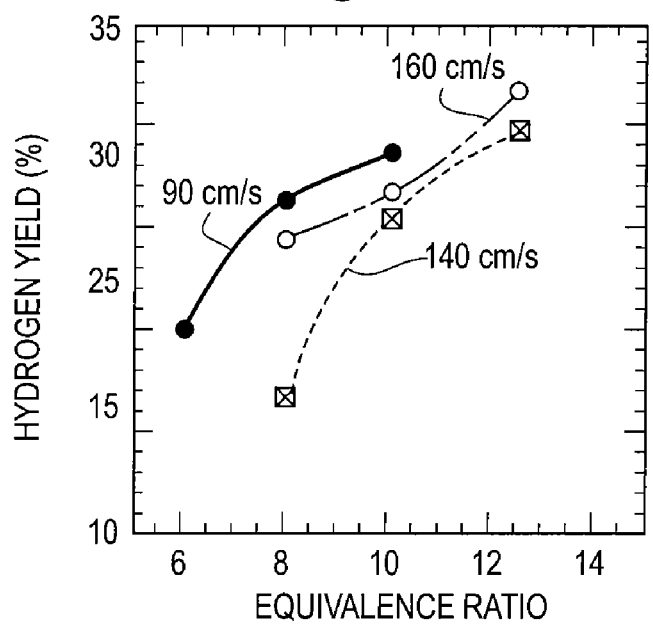

FIG. 15B shows hydrogen yield as a function of equivalence ratio for a cyclic flow reactor after many cycles for a sour gas stream containing about 50% $H_2S$ and about 50% $N_2$ and with oxygen as the oxidizer.

DETAILED DESCRIPTION OF THE ILLUSTRATED EMBODIMENTS

The invention discloses an apparatus and process for the reformation of a hydrogen-containing fluid to hydrogen and other constituents. Specifically, the invention discloses a cyclic flow reactor system containing an inert porous media matrix comprised of high capacitance materials for the reformation of a hydrogen containing fluid. The reformation of the hydrocarbon or hydrogen sulfide fuel is accomplished through the partial oxidation, for example and without limitation, of a fuel-rich mixture and an oxidizer, also called a reactant mixture. The process of the present invention, entailing the reformation of a reactant mixture in a cyclic flow reactor chamber to produce hydrogen comprises the steps of heating the reactor chamber to a high temperature sufficient to initiate a reaction of the reactant mixture, channeling the reactant mixture through a porous media matrix located inside the reactor chamber and reacting the reactant mixture through a reaction zone wherein the reaction zone may be located in any portion of the reactor chamber. The reaction zone may be located in any portion, e.g. all or any part thereof, of the reactor chamber When a reactor in a cyclic flow reactor system is filled with a non-catalytic, or inert, porous media matrix of very high thermal capacitance and radiant emissivity, the media matrix behaves as an energy sink or source. Energy can then be stored in the inert porous media matrix, especially after exothermic reactions. This energy stored in the inert porous media matrix, also known as a packed bed, can then be transferred to a colder fluid to help raise the temperature of the colder fluid. This heat transfer recuperation mechanism also occurs when the reactant mixture direction is reversed such that the heated inert porous media matrix at the extreme end of the reactor chamber that previously was located at the reactor's outlet for the product mixture now is located at the reactor chamber's inlet for the reactant mixture. In this reactor, the inlet and outlet of the reactor chamber are periodically reversed to maintain a consistent high temperature and nearly isothermal volume that provides the necessary residence time to carry out the reforming reactions. With a sufficiently long reactor, the present invention eliminates the need for a reforming catalyst to achieve high hydrogen yield. In addition, the invention also permits the reformation of an ultra-rich mixture of a hydrogen containing fuel with an oxidizer and steam, if necessary, to mitigate carbon production while achieving high hydrogen yield.

FIGS. 1A-1D show a first embodiment in accordance with the present invention. The cyclic flow reactor system 10 of the present invention comprises a reactor 10 wherein the reactor comprises a reactor casing 11 and a reactor chamber 18 inside and parallel to the axial length of the reactor casing. The reactor chamber 18 has a first end and a second end to facilitate the flow of reactant mixture through the chamber and the flow of a product mixture from the chamber. The well-insulated reactor 10 has a system inlet 12 and a system outlet 14 with the reactor chamber 18 further containing an inert porous media matrix 19 serving as an intermediate for heat accumulation and regeneration. The various versions of the reactor as shown in FIGS. 1A-9D are not limited to a design of tubular geometry. One of ordinary skill in the art will appreciate that the design of the axial length of the reactor body 20 could also be square or rectangular, for example and without limitation.

The illustration of FIGS. 1A-1D further shows that the reactor 10 is comprised of a middle section 20b and end sections 20a and 20c connected to the middle section 20b and connected by flanges 15, screws, bolts or other means known in the art. One of ordinary skill in the art will recognize it is not necessary for the reactor to be comprised of subsections 20a, 20b, and 20c, but such a design may provide for easier manufacturing, construction, assembly, and erection. The outer shell casing 16 of the reactor may be constructed from a hard material, such as without limitation high temperature alloy or steel, able to withstand high pressure and temperature.

In one embodiment, the inner diameter of this shell casing 16, best seen in FIGS. 1A-1D, is insulated with high temperature insulation 17 able to withstand high temperatures up to about 3000° C., for example and without limitation. For purposes of the present invention, high temperature will mean at least about 500° C. and preferably about 500° C. to about 3000° C. unless otherwise stated. The high temperature thermal insulation 17 is located between the reactor casing 11 and the reactor chamber 18 along the axial length of the reactor chamber. A localization of the high temperature region in the reactor 10 is accomplished by this layer of thermal insulation 17, for the purpose of controlling, reducing, or eliminating undesired heat dissipation. The thermal insulation 17 is normally referred to as refractory material 17. One skilled in the art will appreciate that the selection of such a refractory material 17 will depend on the chemicals contained in the reactant mixture 40 and product mixture 47, the maximum temperature expected, heat losses, price, and a variety of other factors. These refractory materials 17 can include, without limitation, inexpensive furnace bricks, refractory materials, and ceramics that can handle acid gas streams at very high temperatures up to about 3000° C.

The reactor chamber 18 of the reactor 10 in FIGS. 1A-1D is filled with an inert porous media matrix 19. This inert porous media matrix 19 may comprise a high temperature refractory, ceramic, other similar high temperature material, and mixtures thereof, such that gas may flow readily through the media 19. The inert porous media matrix could be of various forms such as a substantially randomly packed bed or a reticulated structure of certain porosity. In the present invention, the inert porous media matrix may be a inert packed bed and is comprised of a non-catalytic material with a very high melting point, heat capacitance, radiant emissive power, and which can withstand high thermal cycles. More specifically, the material for the composition of the porous media matrix 19 can include, without limitation, aluminum oxide alumina or ceramic, silicon carbide, silicon nitride, zirconium, quartz, various metallic materials, and mixtures thereof, depending on the expected reaction temperature. The porous media matrix 19 can be a specially engineered rigid monolith, a reticulated type matrix, or other randomly packed particles, which may have regular or irregular shapes such as without limitation pellets, extrudates, spherical particles, rectangular particles, granular particles, ring particles, saddle particles, and mixtures thereof.

The inert porous media matrix 19 may possess a porosity, or volume void fraction, between about 5% and about 95%, preferably about 10% to about 90%, and more preferably about 20% to about 80%. In an embodiment of the invention, the inert porous media matrix 19 is composed of at least one randomly packed alumina pellet where a substantial number of the randomly packed alumina pellets have diameters of about 1 to about 100 mm, preferably about 3 to about 50 mm. In another embodiment, a substantial number of the particles in the randomly packed porous media matrix 19 are alumina pellets having a particle size with a target diameter of about 3 millimeters to about 15 millimeters to give the porous media matrix 19 a target porosity of about 50%. By considering the identity of the material, particle size, density, shape and thermal properties, persons skilled in the art would be capable of selecting proper materials for the porous media matrix 19 for efficient operation of the apparatus and process since the temperature profile along the axial length of the reactor chamber 18 will depend not only on the composition of the reactant mixture but also on the thermophysical properties of the inert porous media matrix 19. Additionally, since the reaction zone 43 (FIG. 2C) inside the reactor chamber 18 of the present invention is not fixed in any portion of the reactor chamber 18 and is allowed to propagate through the reactor chamber 18, the propagation speed of the reaction zone 43 may depend on the rate of heat transfer in the porous media matrix 19 and the reaction zone 43. As a result, the cyclic rate for optimal operation of the reactor system and process may also depend on the thermophysical properties of the inert porous media matrix 19.

As shown in FIGS. 1A-1D, each end section 20a, 20c of the reactor 10 is removably connected to a heat exchanger 22. The heat exchangers 22 carry cooling fluid to facilitate rapid heat transfer between the heat exchangers 22 and the reactant mixture 40 if located on the inlet pipe of the reactor; and the heat exchangers 22 and the product mixture 47 if located on the outlet pipe of the reactor. (See also FIGS. 2A-2C) Heat exchangers 22 fitted at each end of the reactor are shown in detail in FIGS. 10A-10D. The present invention may have two, one, or no heat exchangers for the reforming reactions. The heat exchangers 14 may be of an effective design construction commonly known in the art such as without limitation plate and frame or cross flow. These heat exchangers 22 have both inlets 33 and outlets 35 for fluid circulations during the process. In one embodiment of the present invention, the heat exchangers are special cross flow type where the cooling fluid flows tangentially to the reactant mixture or product mixture. The circulating fluid in the heat exchangers may be without limitation water, ethylene glycol, silicone, or other special heat transfer fluids or liquid metals with the ability to withstand the particular process temperature. The inlet and outlet for the heat exchanger 22 may be connected to circulating baths, if needed, to promote continuous circulation of the fluid through the heat exchanger during the reforming process. These heat exchangers 22 can perform several functions. One of the first functions of the illustrated heat exchangers 22 is to maintain the reactant mixture 40 or product mixture 47 through said heat exchangers 22 within a particular process temperature range. The heat exchangers 22 may keep the temperature of the product mixture 47 in the temperature range necessary to quench certain chemical reaction, if needed. For example and without limitation, in the case of hydrocarbon reformation, the heat exchangers 14 might not be needed to quench the product mixture, but rather to prevent outlet areas 8a, 8b, 99 from reaching excessive temperatures that might prematurely ignite the mixture when that particular outlet becomes an inlet immediately after the flow reversal.

FIGS. 1A-1D further show the reactor 10 comprising a piping network 24 surrounding the reactor to canalize the flow of the reactant mixture and the product mixture. The piping network 24 includes top inlet pipes 26 and bottom inlet pipes 28 pipes for the reactant mixture 40 to enter the reactor and top outlet pipes 30 and bottom outlet pipes 32 to allow the product mixture 47 to exit the reactor chamber 18. The system inlet piping 12 consists of a first set of inlet pipes 26, 28 which allow a fuel or fuel gas mixture 40 to enter into a second reactor inlet pipe 8a, 8b at a first end and second end of the reactor 10. The second reactor inlet pipes 8a and 8b are located in a position closer to the reactor chamber 18 than the first set of inlet pipes 26, 28 and also serve as outlets during periods of flow reversal as will be discussed below. In an embodiment using liquid fuels, which are normally vaporized, and/or steam for the reforming reactions, the system inlet piping 12 is kept heated at a suitable temperature to keep the reactant mixture in gaseous state.

In one embodiment, the fuel for the reactant mixture may be atomized, and then mixed with the oxidizer prior to entering the first inlet 26, 28 or second inlets or outlets 8a, 8b. One of ordinary skill in the art will select the proper pipe size to inject the reactant mixture at a sufficient velocity to alleviate safety concerns if the reactant mixtures are premixed. One of ordinary skill in the art will recognize that the fuel, oxidizer, and steam mixture, if steam is used, is not necessarily premixed in these first inlet pipes 26, 28 but rather needs to be mixed prior to entering the porous media matrix.

The piping network 24 also includes the top outlet piping 30 and bottom outlet piping 32 which allow product mixtures thereof to exit the reactor system. Depending on the configuration and use, the outlet piping 30, 32 might need to be heated to a suitable temperature to keep the product mixture in a gaseous state for efficient operations.

Figure 1A:
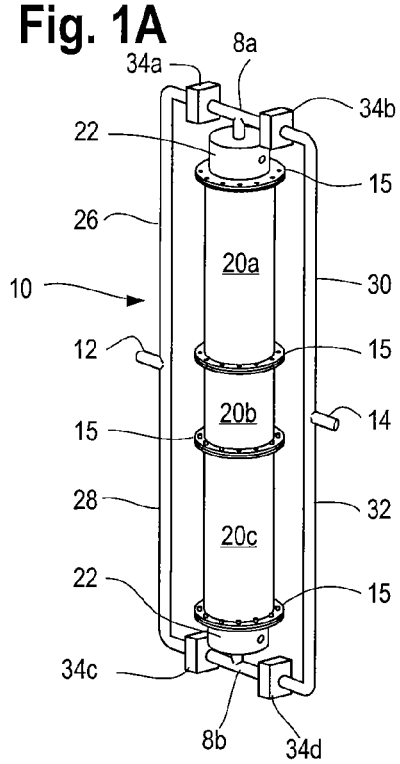
FIG. 1A is a perspective view of a cyclic flow reactor system in accordance with certain elements of the present invention.
Figure 1B:
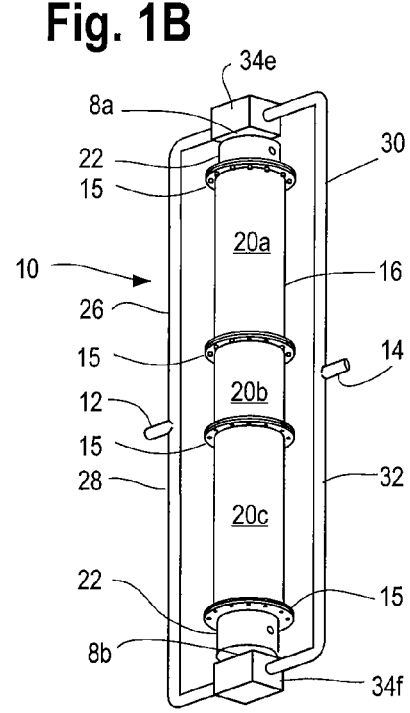
FIG. 1B is a perspective view of the cyclic flow reactor system shown in FIG. 1A fitted with three-way valves.
Figure 1C:
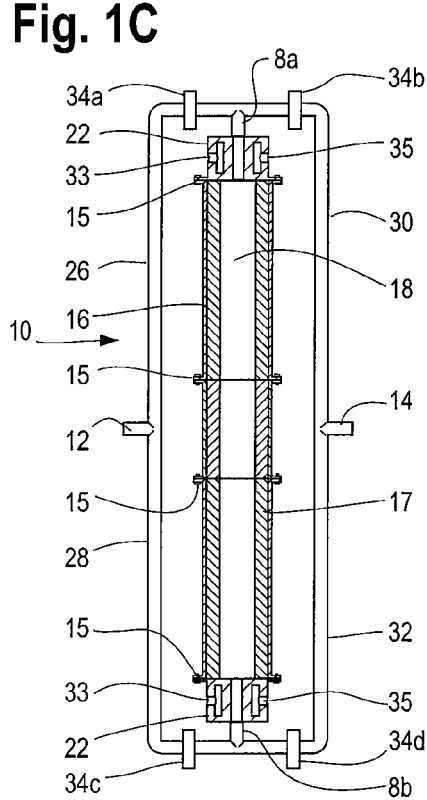
FIG. 1C is a cross-sectional view of the embodiment illustrated in FIG. 1A, shown with an evacuated chamber.
Figure 1D:
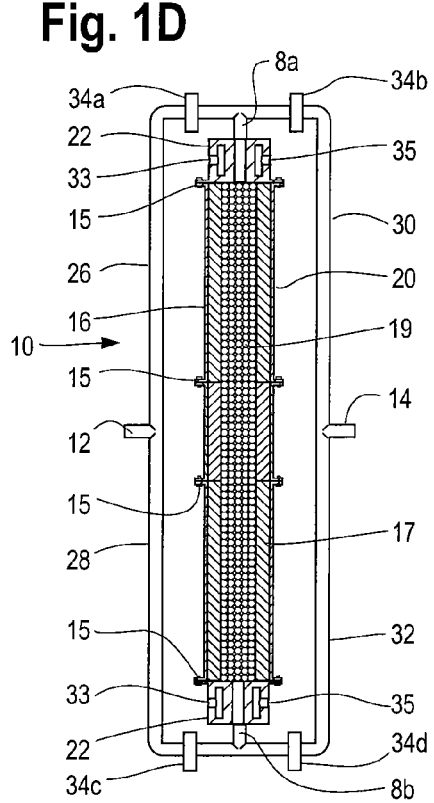
FIG. 1D is a cross-sectional view of the embodiment illustrated in FIG. 1A showing the reactor chamber filled with an inert porous media matrix.

The reactor system 10 further comprises valves 34 that permit the actual reversing of the fluid flow. The valves 34 are normally positioned adjacent to the reactor inlet pipe 8a and the reactor outlet pipe 8b. Through these valves 34 the reactant mixture 40 and product mixture 47, respectively, enter and leave the reactor chamber 18, through the heat exchanger if applicable, at alternating intervals. Although many types of valves known in the art can be used to accomplish this function, in the illustrated embodiment of FIG. 1B, the apparatus is fitted with automatic three-way valves. As seen in FIG. 1B two three-way valves 34e and 34f are positioned at each end of the reactor chamber adjacent to the inlet 8a and outlet 8b piping. In the illustrated embodiment of FIG. 1A, the flow cycling can also be accomplished with solenoid valves, in lieu of the three-way valves, which can be closed or opened rapidly through an electronic control system using preset timing for the flow cycling. FIGS. 1A, 1C, and 1D show that one solenoid valve 34a, 34b, 34c, and 34d is placed at each inlet/outlet 8a and 8b such that at least four solenoid-type valves 34 are needed. In an alternate embodiment of the invention, sensors, such as temperature sensors, i.e. thermocouples, located in a strategic position, can regulate the flow cycling. One embodiment of this invention uses a combination of preset timing and sensor control for operating the flow cycling control system.

When the reaction is initiated, proper flow control will insure the reaction zone 43 is established inside the inert porous media matrix 19 as the reactant mixture passes through the media matrix 19 and the product mixture 47 exits the reactor 10 through the system outlet 14. If the reactant mixture 40 is ultra-rich, the reaction zone 43 will propagate infinitely as a self-sustained process in the same direction as the incoming reactant mixture 40 provided the reactor chamber 18 is also infinitely long. In accordance with the present invention, the fuel oxidizer mixture 40 is ultra-rich or introduced in a proportion that ensures the reaction zone 43 propagates in the same direction as the incoming reactant mixture 40. If steam is added to the reactant mixture 40, its concentration in the reactant mixture 40 may be taken into account so as not to quench the reaction zone 43 or adversely affect the stability of the reaction zone 43. In one embodiment, if the reaction zone 43 is initiated at one extreme end of the inert porous media matrix 19, for example at the bottom 36 of the reactor chamber 18, provided the reactor 10 is standing upright, the temperature along the axial length of the reactor chamber 18 will increase at a steady rate. Eventually, the temperature at the opposite extreme end of the reactor chamber 18 will increase until it is nearly equivalent to the maximum temperature of the reaction. One of ordinary skill in the art will recognize that the maximum reaction temperature will depend on the firing rate and the size of the reactor chamber. Left alone, the reaction zone 43 will eventually reach the opposite end of the reactor chamber 18 and exit the chamber. To prevent the traveling reaction zone 43 from exiting the chamber 18, it is important to either reinitiate the reaction zone 43 at the bottom 36 of the reactor chamber 18 and start the propagation anew or simply reverse the flow directions of the reactant mixture 40 and the product mixture 47. In reversing the flows, now the extreme end of the reactor 10 that was previously the outlet for the product mixture of the reaction has become the inlet, as defined by where the reactant mixture enters the reactor chamber, and the previous inlet is now the new outlet, as defined by where the product mixture exits the reactor chamber.

Figure 2A:
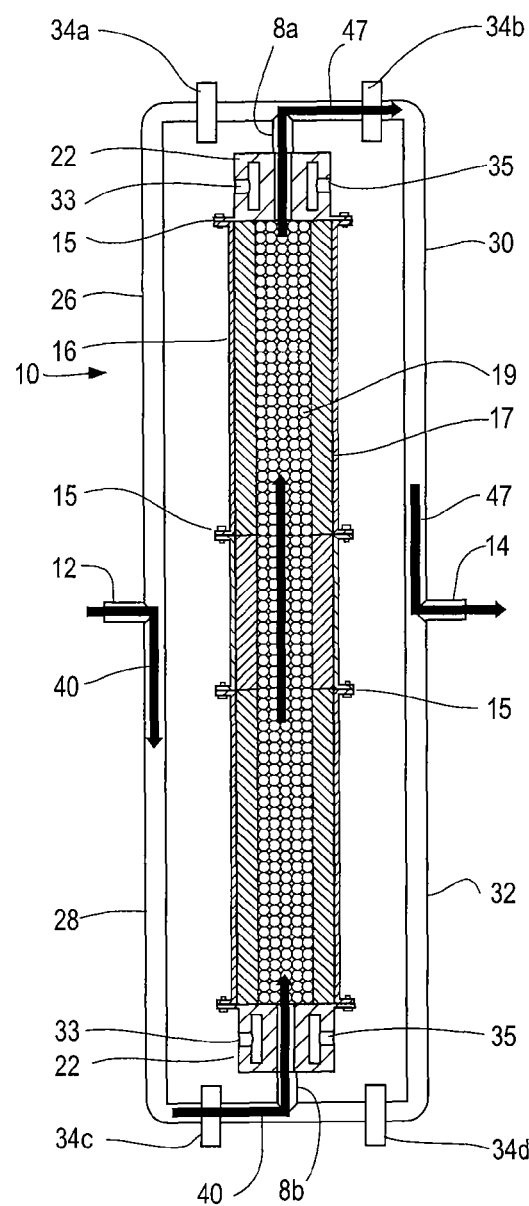
FIG. 2A is a schematic diagram showing the fluid flow through the reactor where the flow is canalized via the system inlet piping, enters the reactor chamber filled with an inert porous media matrix, and subsequently exits via the system outlet piping.
Figure 2B:
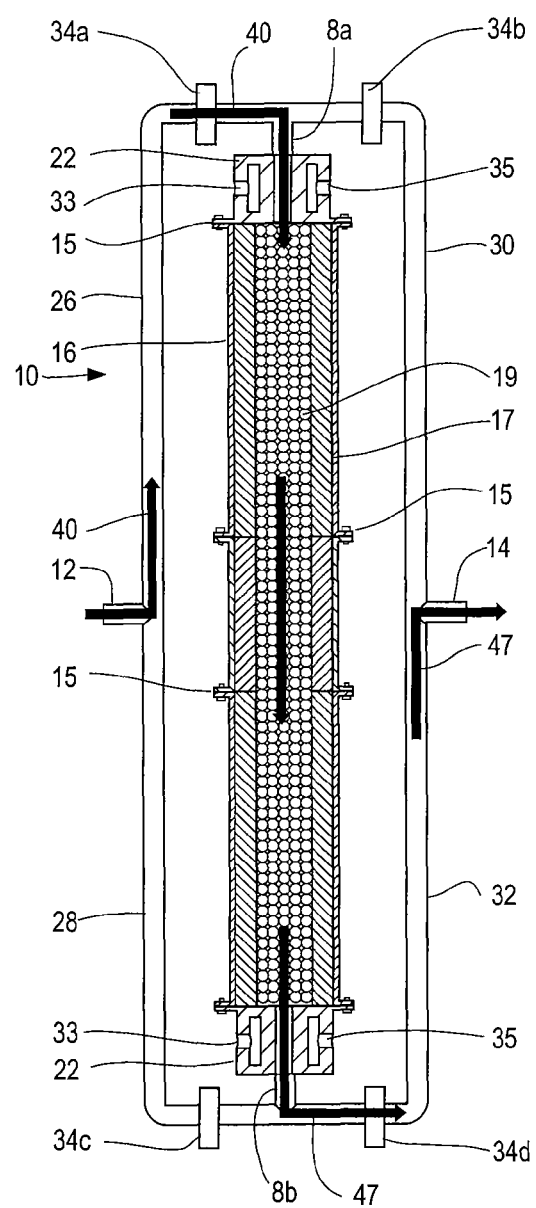
FIG. 2B shows a reactant mixture flow and product mixture flow canalization scheme that is opposite to the scheme shown in FIG. 2A.
Figure 2C:
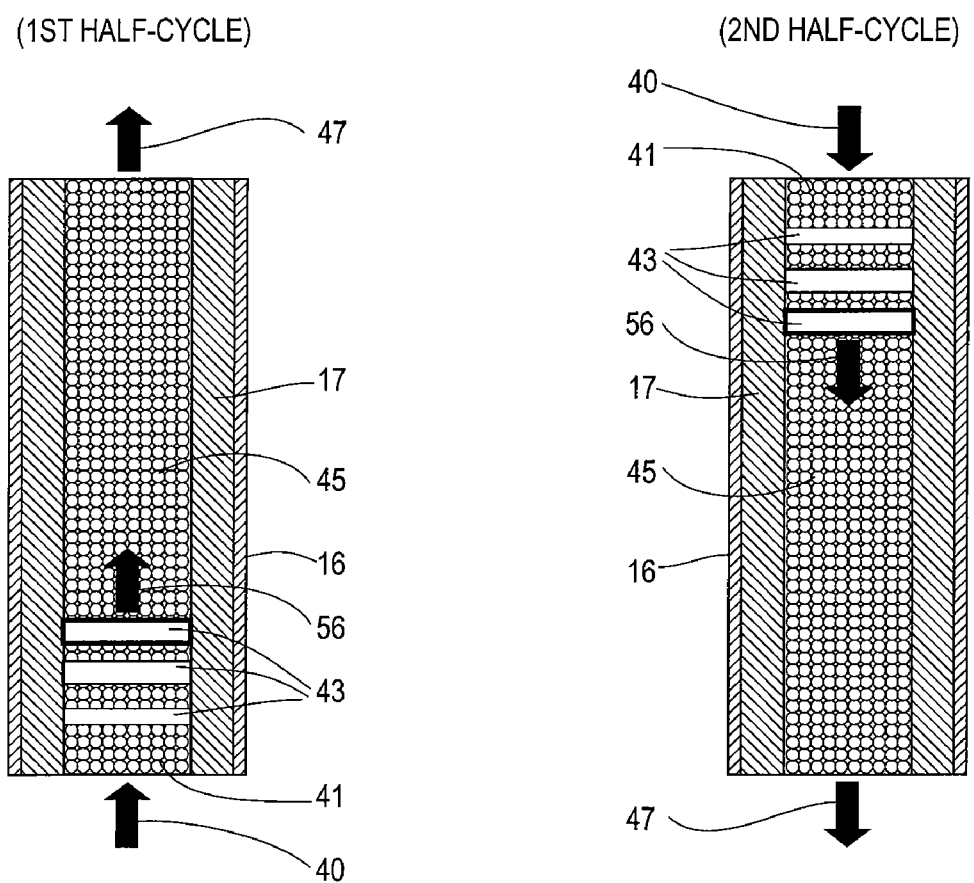
FIG. 2C is a schematic diagram of the mechanisms occurring in carrying out the reformation process with an ultra-rich reactant mixture and showing the establishment of a superadiabatic propagating reaction zone inside the inert porous matrix.

This flow canalization during periods of reversed flow or "cycling" is best illustrated in FIGS. 2A-2C. This function is enabled by its piping network where three-way valves 34e, and 34f or approximately four solenoid type valves 34a, 34b, 34c, and 34d with the ability to close or open very rapidly are strategically placed adjacent to the inlet piping 8a and to the outlet piping 8b to enable a reversal of flow of the reactant mixture 40 and the product mixture 47. If a reactant mixture 40 enters the inlet piping network 26, 28, at least one valve on the inlet side of the piping network would open while the other one would close to canalize the flow to the reactor. The valves on the outlet side of the piping network 24 would perform the opposite function to allow the products to exit the reactor. For example, FIG. 2A shows a flow path that channels the reactant mixture through the bottom of the reactor whereby the inlet bottom valve 34c is open while the top inlet valve 34a is closed. The reactant mixture 40 eventually passes through the second inlet pipe 8b and the heat exchanger 22, if one is provided, for subsequent entrance into the reactor chamber 18 filled with an inert porous media matrix 19. As the reactant mixture 40 flows through this porous media matrix 19, it is being heated by this hot media 41 through transfer of energy that has been deposited in the media 41 through exothermic reactions 43 as shown in FIG. 2C. In FIG. 2C the reactant mixture 40 may be ultra-lean or ultra-rich, such that the already established reaction zone 43 travels in the same direction 56 as the incoming reactant mixture 40. The displacement of the reaction zone 43 in the schematic of FIG. 2C indicates that a velocity for the propagation exists and also that a certain amount of cooling occurs behind this reaction due to energy exchange between the inert porous media 41 and the incoming reactant mixture 40. Once the reactant mixture 40 reaches a high temperature zone inside the porous media matrix 19 that is at least at the ignition temperature, the reactant mixture 40 will ignite and become the new reaction zone 43. The product mixture 47 will flow out from this reaction zone and exit the reactor. As products do not accumulate inside the reactor chamber 19, the product mixture 47 will exit the reactor through the outlet piping 30, 32 with the valves on the outlet side performing the opposite action of the inlet valves.

FIG. 2C shows that the product mixture 47 of the reforming reaction emerges from the reaction zone 43 with a certain amount of energy that is transferred to the inert media section 45 directly above the reaction zone 43. Not only will the temperature of the hot section 45 of the porous media matrix above the reaction zone 43 increase, but the reaction zone 43 itself will continue to travel until it reaches the top of the reactor chamber. If the positions of the valves 34a-d in FIG. 2A are reversed, the directions of the reactant mixture 40 and product mixture 47 are now canalized as depicted in FIG. 2B. In this second half cycle, displayed in FIG. 2B and depicted in FIG. 2C, the incoming reactant mixture 40 enters the reactor chamber 18 via the top through the now new second inlet pipe 8a. This new flow canalization scheme is aided by the fact that the top valve 34a between the first top inlet pipe 26 and second inlet pipe 8a is now open while the bottom valve 34c between the bottom first inlet pipe 28 and second inlet pipe 8b is now closed. The opposite action must also take place on the outlet side whereby the bottom valve 34d between the bottom first outlet pipe 32 and second inlet pipe 8b is now open as the top valve 34b between the top first pipe 30 and second outlet pipe 8a closes. In FIG. 2C the reaction zone 43 now propagates downward, the same direction 45 as the reactant mixture 40. This process of cycling the flow by alternating the inlet and outlet can continue indefinitely provided that the direction of the flow is reversed prior to the reaction zone 43 exiting the reactor chamber 18. The present invention may also include cycling of multiple valves for each half-cycle.

One important aspect of this reactor system and process is the time between cycles or reversal of flow. In an embodiment, the cycle could vary from about one minute to about a few days. Although it is imperative that the direction of the reactant mixture and product mixture be reversed to prevent the reaction zone from escaping the reactor chamber 18, it is not necessary to wait for a long time since the reaction zone 43, propagates at normally less than 1 millimeter/second depending on the composition of the reactant mixture 40. In one embodiment the velocity of the reactant mixture, fuel and oxidizer, inside a section of the porous media matrix at room temperature can be maintained between about 5 and about 500 cm/s. In the present invention the velocity of the reactant mixture inside a section of the porous media matrix at room temperature is maintained between 25 and 250 cm/s and the velocity of the reaction zone specifically is on the order of 0.1 mm/s. The frequency of this flow reversal permits optimization of the reaction temperature within the reactor and allows energy stored in the porous media matrix 19 to be used to heat the incoming reactant mixture 40. In fact the direction of the flow can be reversed as soon as the porous media matrix section 20a or 20c at the outlet reaches the ignition temperature of the reactant mixture. In essence, it is possible to develop a control system for reversing the direction of the flow when the outlet of the reactor chamber reaches a certain temperature, such as without limitation, the ignition temperature of the reactant mixture 40. The temperature data for this control scheme could be obtained by strategically placed sensors. An alternative cycling control scheme could be based on preset timing where the inlet and outlet of the reactor chamber 18 are alternated regardless of the temperature profile inside the reactor chamber 18. In the present invention, a control system for alternating the direction of the flow employs a preset timing method in addition to outlet temperature sensors as the signal to cycle the direction 45 of the flow.

As shown in FIGS. 3A-3B and 5A-5B, in an alternate design of the reactor 10, otherwise identical to that of FIGS. 1A-1D, an aperture or port is incorporated into the reactor casing and internal chamber which provides for the addition of an external energy source to initiate an exothermic process, such as without limitation, combustion or partial oxidation. In an embodiment, the external energy source or heating device can be in the form of an electrical resistive heater or other heating means located at any suitable position between the inlet and outlet pipes 8a, 8b permitting the initiation of exothermic reactions. The external energy can be derived from rich or lean hydrocarbon flames, electric heaters, microwave source, inductive heaters, electron beams, or other sources of electromagnetic radiation known in the art that can be suitably employed to raise the temperature of a solid or fluid. In another embodiment, the external energy source may be in the form of burners using oxidation or combustion of a liquid or gaseous hydrogen containing fuel with an oxygen containing gas. The burners may be located in the middle section 20b, at the end sections 20a or 20c or even at the inlet 8a or outlet pipes 8b. As shown in FIGS. 3A-3B and 5A-5B, the ports 75 are located in the midsection 20b along the axial length of the reactor and the external energy source is comprised of resistance wires, such as Kanthal or tungsten. If resistance wires are used, they should be well protected to avoid direct contact with the reactant mixture 40 or product mixture 47. The external energy source is utilized to increase the temperature of the particular location of the inert porous media matrix. The embodiment in FIGS. 3A-3B show the reactor 10 incorporating the external ports 75 also fitted with heat exchangers 22 at each end. The embodiment of FIGS. 5A-5B is not fitted with heat exchangers 22. For the embodiment of FIGS. 1A-1D the external energy source would be utilized for ignition purposes. The external energy source employed in FIGS. 3A-3B and 5A-5B can be used as an ignition means to initiate the process and also to inject excess energy after the process has been initiated. Although this excess energy is not required as the process should be self sustained, the excess energy can increase the efficiency of the process under certain circumstances. When the external energy source raises the local temperature of the porous media matrix to a sufficient level to initiate a reaction, or the ignition temperature, the reactant mixture is then allowed to flow through the inlet piping network 26, 28 and through the heat exchanger 22 to the localized hot zone in the inert porous media matrix 19 that was previously heated by the external energy source in order to initiate self-sustained exothermic reactions. Once ignition occurs, a self-sustained high temperature reaction zone can be maintained inside the reactor chamber 18 between about 500° C. and about 3000° C. or a suitable temperature that is less than the maximum temperature for safe operation of the refractory insulation material 17.

FIGS. 4A-4B show an alternate design for the reactor embodiment of FIGS. 1A-1D wherein the heat exchangers 22 at each end of the reactor are omitted. The omission of the heat exchangers 22 requires that additional care must be taken with the reforming process. The heat exchangers 22 can be omitted from the other embodiments of the reactor system as well. The structure and operation of the embodiments illustrated in FIGS. 3A-3B, 4A-4B, and 5A-5B are similar to the above-described details for FIGS. 1A-1D. Further, in FIGS. 3A-3B, 4A-4B, and 5A-5B, a piping network similar to the one used in FIGS. 1A-1D and FIGS. 2A-2B or any other suitable piping network with associated three-way, solenoid, or other valves may be used to canalize the flows.

FIGS. 6A and 6B illustrate a second embodiment of the reactor 100 where the reactor 100 has a U-shaped design such that the ends 102, 104 of the reactor 100 are in close proximity. The cyclic flow reactor system 100 of the present invention comprises a reactor 100 wherein the reactor comprises a reactor casing 111 and a reactor chamber 118 inside and parallel to the axial length of the reactor casing. The reactor chamber 18 has a first end and a second end to facilitate the flow of reactant mixture through the chamber and the flow of a product mixture from the chamber. The reactor design of FIGS. 6A-6B has certain advantages in that a much longer reactor can be designed, constructed, and erected with the addition of two extra elbow lengths 106, 108. This particular embodiment may also permit easier erection since the overall height of the reactor 100 can be reduced. With this design, a longer reactor can be constructed without increasing the overall length of the reactor and, at the same time, increasing the residence time for the reactant mixture inside the reactor. This improvement can result in a more efficient and economical process with a higher yield of product. The embodiment of FIGS. 6A and 6B also includes heat exchangers 122 fitted at each end 102, 104.

The illustration of FIGS. 6A-6B further shows that the reactor is comprised of a middle section 120b and end sections 120a and 120c connected to the middle section 120b and connected by flanges, screws, bolts or other means known in the art. As previously discussed for the embodiment shown in FIGS. 1A-1D, this optional design provides for easier manufacturing, construction, assembly, and erection.

The inner diameter of this shell structure 116, best seen in FIG. 6B is insulated with high temperature insulation 117 able to withstand very high temperatures up to about 3000° C., for example. The high temperature thermal insulation 117 is located between the reactor casing 111 and the reactor chamber 118 along the axial length of the reactor chamber with similar arrangement and construction as that previously described for other embodiments. A localization of the high temperature region in the reactor is accomplished by this layer of thermal insulation 117, for the purpose of controlling, reducing, or eliminating undesired heat dissipation.

The reactor chamber 118 of the reactor 100 is filled with an inert porous media matrix 119. The inert porous media matrix 119 has similar structure, composition, and function to that previously described for the first embodiment in FIGS. 1A-1D, 3A-3B, 4A-4B, and 5A-5B.

Although not shown in 6A-6B, a piping network similar to the one used in FIGS. 1A-1D and FIGS. 2A-2B or any other suitable piping network with associated three-way, solenoid, or other valves may be used to canalize the flows. The structure and operation of the embodiments illustrated in FIGS. 6A and 6B are otherwise similar to the above-described details for FIGS. 1A-1D.

The design of the reactor system shown in FIGS. 7A-7D is similar to the embodiment of FIGS. 6A-6B with the exception that the embodiment of FIGS. 7A-7D incorporates at least one external port 188 for mounting an external energy source. The external energy can be derived from rich or lean hydrocarbon flames, electric heaters, microwave source, inductive heaters, electron beams, or other sources of electromagnetic radiation known in the art that can be suitably employed to raise the temperature of a solid or gas media. In the illustrated embodiment, the external energy source is in the form of burners using liquid or gaseous hydrogen containing fuel with an oxygen containing gas. The external energy source provides an ignition mechanism and/or injects extra energy during the reforming reactions. As with other embodiments of the present invention, the heat exchangers 122 fitted at the ends of the reactor can be removed if the heat exchangers 122 are not needed for a particular application as seen in FIG. 7D. The structure and operation of the embodiments illustrated in FIGS. 7A-7D are otherwise similar to the above-described details for FIGS. 1A-1D and 6A-6B. Although not shown in 7A-7D, a piping network similar to the one used in FIGS. 1A-1D and FIGS. 2A-2B or any other suitable piping network with associated three-way, solenoid, or other valves may be used to canalize the flows.

Figure 8A:
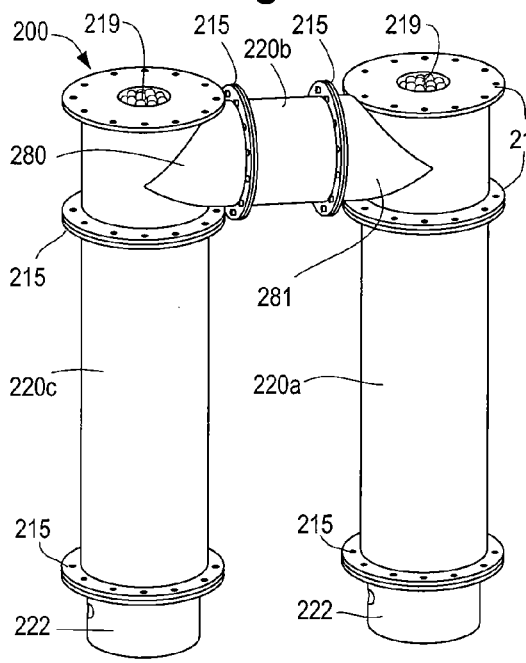
FIG. 8A is perspective view of a third embodiment of the present invention where the reactor has a U-shaped design and includes at least two external ports to enable mounting an external energy source on the reactor system.
Figure 8B:
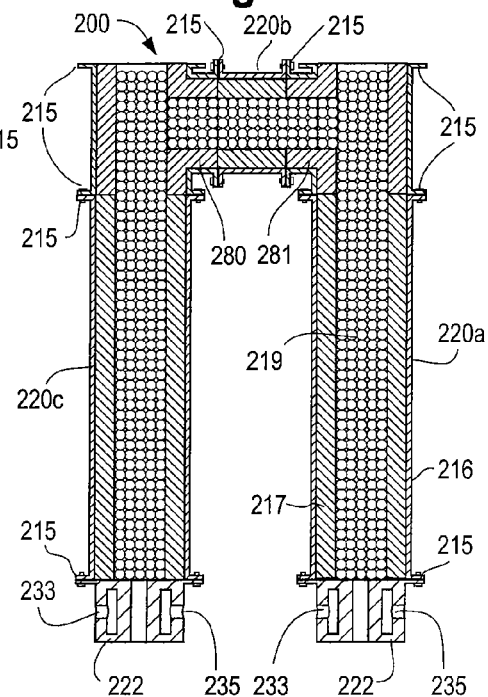
FIG. 8B is a cross sectional view of the embodiment of FIG. 8A showing the reactor chamber filled with an inert porous media matrix.
Figure 8C:
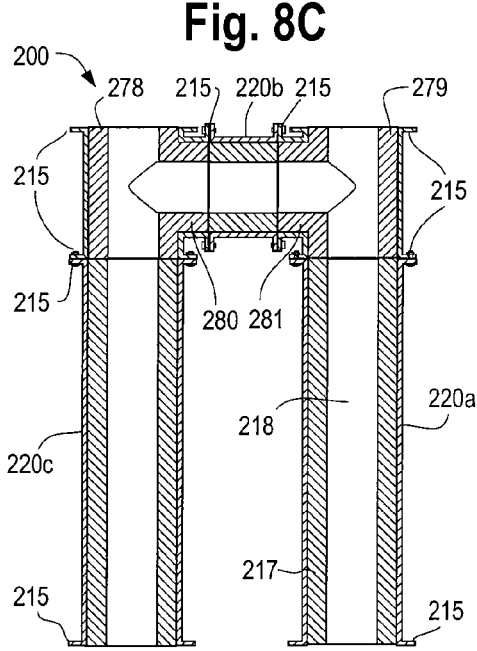
FIG. 8C is an alternate design for the embodiment shown in FIG. 8A where the heat exchangers at the inlet and outlet of the reactor chamber are omitted.
Figure 8D:
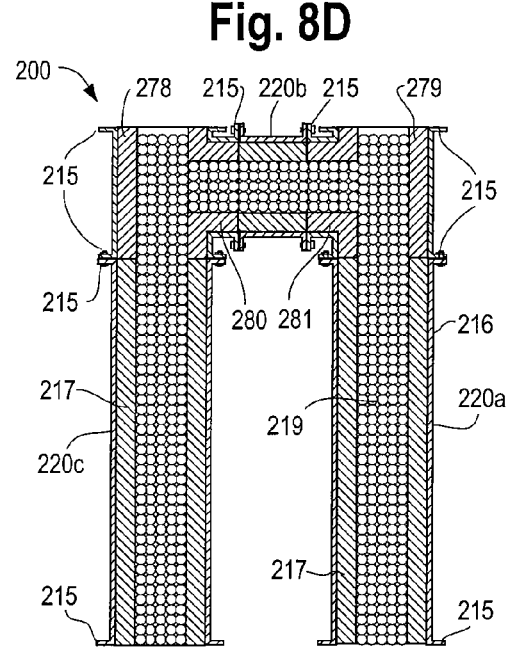
FIG. 8D is a cross-sectional view of the embodiment in FIG. 8C showing the reactor chamber filled with an inert porous media matrix.
Figure 10A:
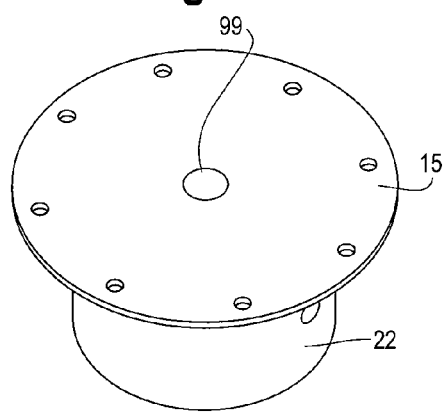
FIG. 10A is a perspective view of a heat exchanger placed at the inlet and/or outlet of the reactor in accordance with certain elements of the invention.
Figure 10B:
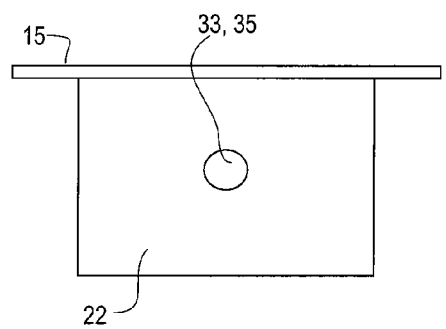
FIG. 10B is a side view of the heat exchanger shown in FIG. 10A.
Figure 10C:
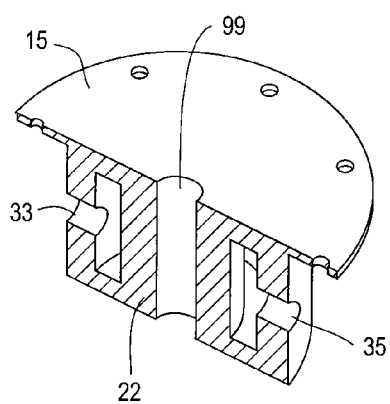
FIG. 10C is a cross-sectional view of heat exchanger shown in FIG. 10A.
Figure 10D:
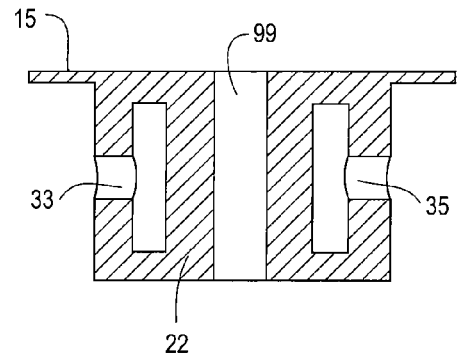
FIG. 10D is front view of the cross-sectioned heat exchanger shown in FIG. 10C.

FIGS. 8A-8D illustrate a third embodiment of the cyclic flow reactor system 200 where the reactor chamber 218 of the reactor 200 is also of an approximately U-shaped design and incorporates at least two external ports 275 to enable mounting external energy sources on the reactor. A first extension 280 of the reactor 200 removably connects first burner 278 to the middle section 220b of the reactor 200. A second extension 281 connects second burner 279 to the middle section 220b. FIGS. 8C-8D, illustrate an alternate design of the embodiment presented in FIGS. 8A-8B by omitting the heat exchangers 222 at each end of the reactor.

The cyclic flow reactor system 200 of the present invention comprises a reactor 200 wherein the reactor comprises a reactor casing 211 and a reactor chamber 218 inside and parallel to the axial length of the reactor casing 211. The reactor chamber 218 has a first end and a second end to facilitate the flow of a reactant mixture through the reactor chamber 218 and the flow of a product mixture from the chamber. The illustration of FIGS. 8A-8D further shows that the reactor is comprised of a middle section 220b and end sections 220a and 220c connected to the middle section 220b and connected by flanges, screws, bolts or other means known in the art. As previously discussed for the embodiment shown in FIGS. 1A-1D, this optional design provides for easier manufacturing, construction, assembly, and erection.

The inner diameter of this shell structure 216 is insulated with high temperature insulation 217 able to withstand very high temperatures up to about 3000° C., for example. The high temperature thermal insulation 217 is located between the reactor casing 211 and the reactor chamber 218 along the axial length of the reactor chamber with a similar arrangement and construction as that previously described for other embodiments. A localization of the high temperature region in the reactor is accomplished by this layer of thermal insulation 217, for the purpose of controlling, reducing, or eliminating undesired heat dissipation.

The reactor chamber 218 of the reactor 200 is filled with an inert porous media matrix 219. The inert porous media matrix 219 again has similar structure, composition, and function to that previously described for the embodiment shown in FIGS. 1A-1D, 3A-3B, 4A-4B, and 5A-5B.

The structure and operation of the embodiments illustrated in FIGS. 8A-8D is otherwise similar to the above-described details for FIGS. 1A-1D. Although not shown in 8A-8D, a piping network similar to the one used in FIGS. 1A-1D and FIGS. 2A-2B or any other suitable piping network with associated three-way, solenoid, or other valves may be used to canalize the flows.

FIGS. 9A-9D illustrate a fourth embodiment for the cyclic flow reactor system 300. The cyclic flow reactor system 300 of the present invention again comprises a reactor 300 comprising a reactor casing 311 and a reactor chamber 318 inside and parallel to the axial length of the reactor casing 311. The reactor chamber 318 has a first end and a second end to facilitate the flow of reactant mixture through the chamber and the flow of a product mixture from the chamber. The reactor 300 of FIGS. 9A-9D further includes a chamber 394 for the placement of electrodes 395 near the center section 320b of the reactor which connects to the external energy sources at 378 and 379. The electrodes 395 placed at the center chamber 394 provide for the generation of an arc type of plasma that serves as another external source of energy during the reforming reactions. The generated plasma can be in the form of an arc jet or a gliding arc discharge. This embodiment further incorporates at least one external port or aperture to enable mounting still another external energy source at 378, 379. This additional external energy can be derived from rich or lean hydrocarbon flames, electric heaters, microwave source, inductive heaters, electron beams, or other sources of electromagnetic radiation known in the art that can be suitably employed to raise the temperature of a solid or gas media. In this embodiment of the present invention, the external energy source again is in the form of burners using liquid or gaseous hydrogen containing fuel with an oxygen containing gas. The external energy source can be used as an ignition mean thereby heating a section of the inert porous media matrix to the ignition temperature of the reactant mixture 40 to be introduced into the reactor chamber. The other external energy can also be used in addition to the external energy that will be provided by the plasma 395 through the center chamber 394 of the reactor. Still, another embodiment can totally omit mounting of the external heating source at the external port. In FIG. 9D, the heat exchangers 322 fitted at each end of the reactor are omitted from the embodiment but great care must be taken in controlling the inlet and outlet temperatures of the reactants and products if the heat exchangers 322 are omitted. The structure and operation of the embodiments illustrated in FIGS. 9A-9D is similar to the above-described details for FIGS. 1A-1D, 7A-7D, and 8A-8D. Although not shown in FIGS. 9A-9D, a piping network similar to the one used in FIGS. 1A-1D and FIGS. 2A-2B or any other suitable piping network with associated three-way, solenoid, or other valves may be used to canalize the flows.

Example

Hydrocarbon Reformation

In accordance with this invention, a hydrocarbon mixture to be reformed for the production of hydrogen and carbon monoxide, often referred to as synthesis gas by those skilled in the art, is rich having an equivalence ratio of at least about unity. For the reformation of hydrocarbon and oxygen containing reactant mixtures 40, any of the above-described embodiments of the cyclic flow reactor system may be utilized. The reactant mixture may comprise a hydrocarbon greater than $C_5$. In another embodiment, the reactant mixture may comprise a hydrocarbon greater than $C_2$.

In accordance with this invention, the reactant mixture 40 is an ultra-rich mixture of a hydrocarbon and an oxidizer having an equivalence ratio greater than the equivalence ratio of the upper flammability limit and less than ten times the equivalence ratio of said upper flammability limit for the production of hydrogen and other constituents including formed hydrocarbon species shown as follows:

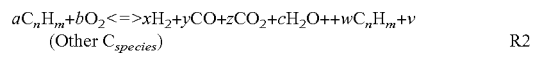

$$aC_nH_m + bO_2 <=> xH_2 + yCO + zCO_2 + cH_2O + + wC_nH_m + v \text{ (Other } C_{species}) \quad R2$$

One of ordinary skill in the art will recognize that the molar coefficients a,b,c,x,y,z,v, and w displayed above in R2 as well as the atomic subscripts n and m will vary depending on the reactant mixture selected. Also, the amount (v) of other carbon based species (Other $C_{species}$) in R2, to include, without limitation, other hydrocarbon species and solid carbon that might form, will depend on the amount each reactant. Oxygen ($O_2$) represent of the amount of oxygen in an oxygen containing gas. Further, the values for the molar coefficients will determine whether the reactant mixture is rich, ultrarich, lean or ultralean.

In another variation of the process, steam can be added to the hydrocarbon and oxidizer reactant mixture 40 while keeping the reactant mixture 40 rich or ultra-rich. In the present invention, if steam is used, the steam content of the mixture 40 is limited to a 5 to 1 molar ratio of steam to carbon.

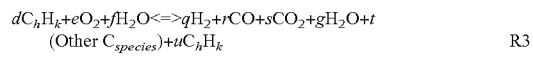

$$dC_hH_k + eO_2 + fH_2O <=> qH_2 + rCO + sCO_2 + gH_2O + t \text{ (Other } C_{species}) + uC_hH_k \quad R3$$

Again, one of ordinary skill in the art will appreciate that the molar coefficients d,e,f,g,q,r,s,t and u displayed above in R3 as well as the atomic subscripts h and k will vary depending on the reactant mixture selected. Also, the amount t of other carbon based species (Other $C_{species}$) in R3, including, without limitation, other hydrocarbon species and solid carbon that may form, will depend on the amount present in the reactant mixture. Oxygen ($O_2$) represents the amount of oxygen in the oxygen-containing gas or oxidizer. Further, the values for the molar coefficients will determine whether the mixture is rich, ultrarich, lean or ultralean.

When steam is added to the reactant mixture, the process may be operated in a range of equivalence ratios that allow for process stability. In one embodiment, the reactor system and process will be operated at pressures as high as possible to maximize the separation efficiency if the hydrogen produced from the reforming reactions needs to be purified by devices such as membranes, pressure swing adsorption or combinations thereof as are commonly known in the industry.

Figure 11A:
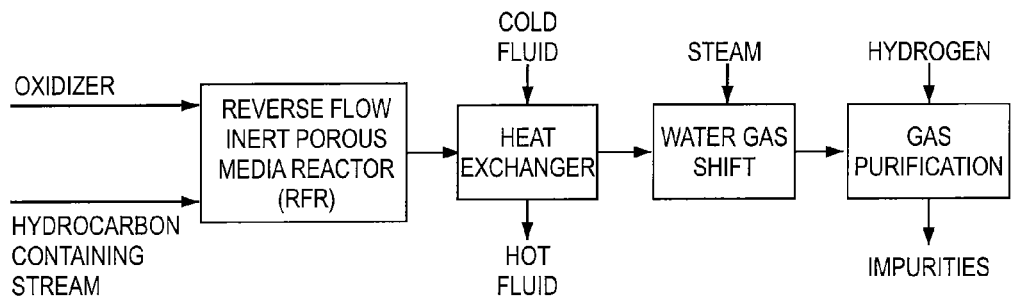
FIG. 11A is a simplified process flow diagram for obtaining a substantially pure hydrogen product mixture stream by reacting a hydrocarbon fluid with an oxidizer inside a cyclic flow reactor in accordance with the present invention.
Figure 11B:
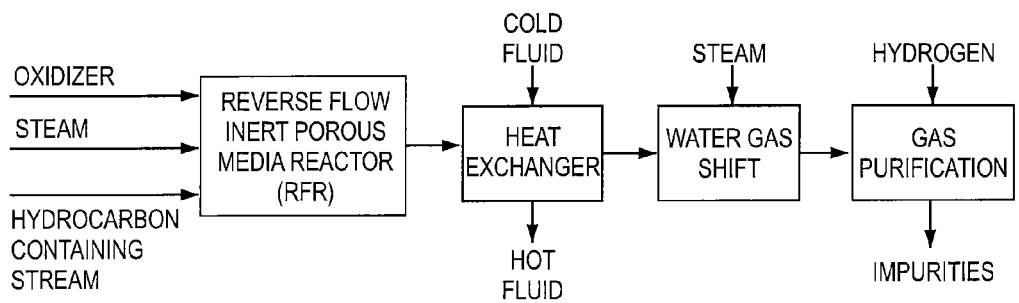
FIG. 11B is a simplified process flow diagram of an alternate method for obtaining a substantially pure hydrogen product mixture stream by reacting a hydrocarbon fluid with an oxidizer and steam inside a cyclic flow inert porous media reactor in accordance with the present invention.

FIGS. 11A-11B is an overall simplified diagram for a process whereby a reactant mixture containing hydrocarbon is reformed to synthesis gas inside the reactor 10, or a multitude of reactors, for the purpose of producing relatively pure hydrogen. The reactant mixture comprising hydrocarbon and an oxidizer is first reacted inside the reactor, and the product mixture is then passed through a bed or a number of beds of shift catalysts such as iron oxide or copper oxide to increase the hydrogen concentration if desired. The product mixture resulting from the shift reactions occurring over the catalyst bed is then sent to a gas separation or purification unit to produce a product mixture with relatively pure hydrogen and other impurities. This downstream process separation technology here is commonly known in the art.

Example

Hydrogen Sulfide Reformation

Another method of the process comprises reacting an ultra-rich mixture of $H_2S$ and an oxygen containing fluid inside the reactor 10 for the purpose of obtaining a product mixture 47 containing substantially pure hydrogen. The reformation of $H_2S$ to hydrogen and sulfur presents certain challenges not encountered in hydrocarbon reformation. For example, as $H_2S$ has a relatively low heat content compared to other possible fuels, obtaining a very high temperature in the partial oxidation regime is not likely. More importantly, $H_2S$ reforming requires the reaction to reach near equilibrium conditions at high temperature to obtain high yield. The intrinsic recuperating mechanism of the inert porous media matrix 19 and the reactor's ability to create an isothermal high temperature volume rendered it a cost effective option for the reformation of $H_2S$ by providing the necessary residence time and temperature.

For $H_2S$ reforming, the $H_2S$ concentration of the reactant mixture, also referred to as the sour gas stream here, can vary from about 10% to about 100% by volume. The process is normally most economical at a minimum $H_2S$ concentration of about 25% by volume in the sour gas stream. During the partial oxidation of a certain amount g of $H_2S$ with a substoichiometric amount i of an oxygen containing gas seen in reaction R4 below, the reaction $$gH_2S+iO_2 <=> mH_2+nS_2+oSO_2+qH_2O+pH_2S \qquad R4$$

will yield a certain amount of hydrogen m, sulfur n, water q and sulfur dioxide o. Also a certain amount of $H_2S$ will be left unreacted p. Oxygen ($O_2$) represents the amount of oxygen in the oxygen-containing gas or oxidizer. If the reactant mixture is ultra rich, the concentration of $SO_2$ in the product mixture will decrease by hydrogenation reactions such as reaction R5 below $$1H_2+kSO_2=kH_2S+kO_2+(1-k)H_2 \qquad R5$$

for almost complete elimination of sulfur dioxide. The reactant mixture 40 without limitation is preferably ultra-rich. In accordance with this invention, the equivalence ratio of the reactant mixture is greater than about 2 and less than about 20 with a target equivalence ratio greater than about 5 and less than about 15. The residence time for the process may generally vary between about 0.1 and about 1000 seconds, preferably between about 0.15 and about 150 seconds, and more preferably between about 0.2 and about 20 seconds.

In an embodiment of the present invention, the reformation of hydrogen sulfide is performed in a reactor 10 fitted with heat exchangers 22. When reforming hydrogen sulfide, the heat exchangers 22 may perform the dual function of 1) quenching the product mixture at the outlet and 2) keeping the inlet at a suitable temperature to prevent sulfur condensation when it becomes an outlet after the flow cycling. It is very important to quench the product mixture very fast to a temperature below about 700° C. to prevent recombination reactions between hydrogen and sulfur that can lead to the formation of $H_2S$. The circulating fluid in the heat exchangers 22 is utilized to operate the heat exchangers 22 such that the reactant mixture 40 and product mixture 47 flowing through the heat exchangers 22 are maintained in the range of about 100° C. to about 800° C., and without limitation, preferably between about 144° C. and about 700° C.

Figure 12A:
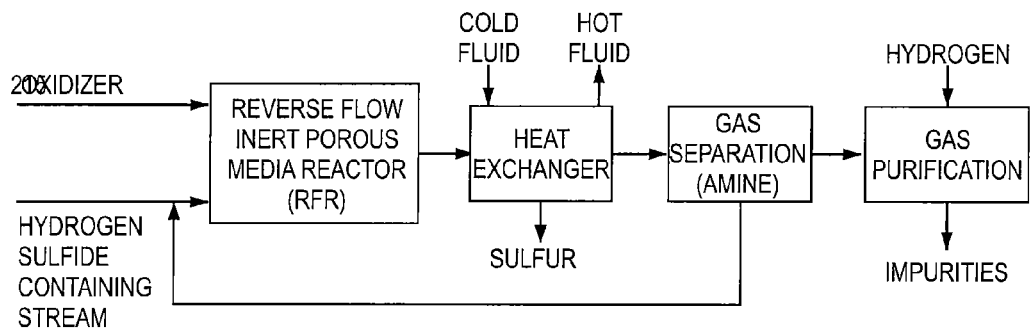
FIG. 12A is a process flow diagram for obtaining a substantially pure hydrogen product mixture stream by reacting a hydrogen sulfide-containing stream with an oxidizer inside a cyclic flow reactor in accordance with the present invention.
Figure 12B:
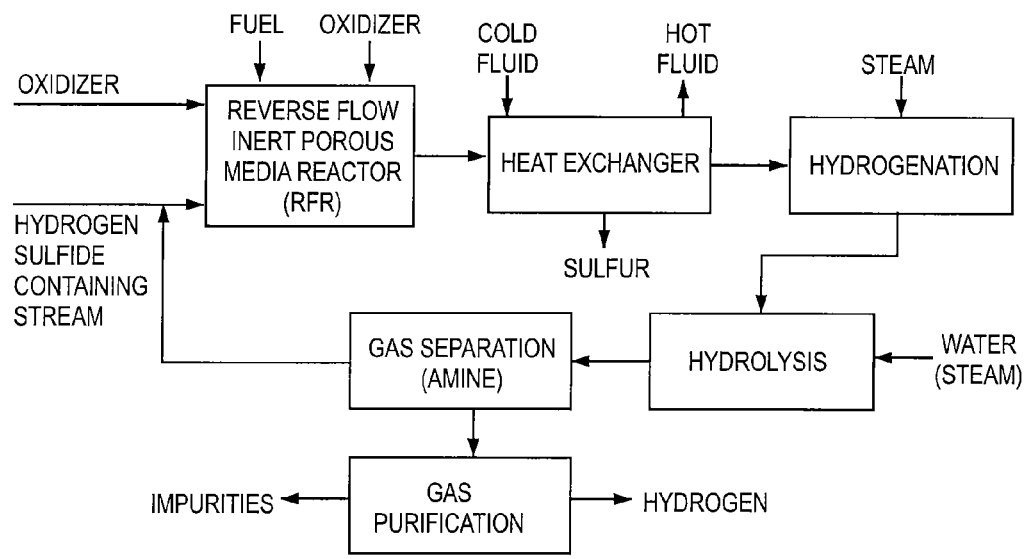
FIG. 12B is a process flow diagram of an alternate method for the reformation of a hydrogen sulfide-containing stream with an oxidizer inside a cyclic flow reactor in accordance with the present invention whereby external energy is provided by the combustion or partial oxidation of fuel.

FIGS. 12A-12B shows simplified diagrams for processes whereby sour gas streams are reformed inside the reactor or a multitude of reactors for the purpose of producing substantially pure hydrogen. As shown in FIGS. 12A-12B, the product mixture upon leaving the outlet of the reactor may be sent to a collection chamber where the flow is cooled and the sulfur collected. The leftover hydrogen sulfide in the product mixture can be separated by one of the amine purification processes or other processes known in the art. FIG. 12A relates to a process where the product mixture does not contain any impurity such as $SO_2$, COS, $CS_2$, and other impurities that are usually formed due to carbon containing species such as hydrocarbons or CO or $CO_2$ $$a_iH_2S+b_iO_2+c_iC_{species} <=> x_iH_2+y_iS_2+z_iSO_2+w_iH_2S+ \\ m_iCOS+n_iCS_2+d_iC_{species} \qquad R6$$

in the sour gas reactant mixture. $C_{species}$ above in R6 denotes carbon-containing compounds such as, without limitation, carbon monoxide, carbon dioxide, or other complex hydrocarbons. The number and type of carbon compounds will vary depending on the source of the hydrogen sulfide in the reactant mixture. If $SO_2$, COS, and $CS_2$ are present in the product mixture exiting the reactor, FIG. 12B shows that processes such as hydrogenation of $SO_2$ and hydrolysis of COS and $CS_2$ might have to be incorporated. Unreacted $H_2S$ is recycled and the hydrogen in the leftover gaseous stream is further purified through a membrane, pressure swing adsorption, or other gas purification processes.

Varying the operating pressure of the reactor can also provide an increased yield of a desired product while assisting in the separation of the product mixture into individual components through the process. For example, Table I shows that a

TABLE I

Product composition from the reformation of a hydrogen sulfide containing stream with air as the oxidizer inside a cyclic flow inert porous media reactor. The method was reduced to practice in the apparatus shown in FIG. 1B. No external source of energy participated in the reformation process.

| Reactant Composition (% Volume) | | | Product Composition (% Volume) | | | |
|---|---|---|---|---|---|---|
| $N_2$ | $O_2$ | $H_2S$ | $H_2$ | $N_2$ | $H_2S$ | $SO_2$ |
| 63.41 | 8.50 | 27.96 | 4.68 | 63.41 | 5.89 | 0.07 |
| 61.56 | 6.94 | 31.37 | 6.34 | 61.56 | 8.73 | 0.05 |
| 65.02 | 8.77 | 26.08 | 5.81 | 65.02 | 5.41 | 0.05 |
| 62.98 | 7.17 | 29.72 | 8.09 | 62.98 | 7.03 | 0.04 |
| 47.94 | 12.54 | 39.40 | 7.30 | 47.94 | 10.65 | 0.01 | relatively high yield of hydrogen can be obtained from the product mixture exiting the reactor after the exothermic reaction of hydrogen sulfide with air as the oxidizer. Table I also shows that a minimal amount of sulfur dioxide is produced when the reactant mixture is ultra-rich. Alternatively, if relatively pure oxygen is used as the oxidizer, richer reactant mixtures can be reformed as displayed in Table II. An oxidizer stream comprising pure oxygen in the reactant mixture permits reformation at much higher firing rates to achieve a higher temperature than is possible with air.

TABLE II

Product composition from the reformation of a hydrogen sulfide containing stream with a relatively pure oxygen stream as the oxidizer inside a cyclic flow inert porous media reactor. The method was reduced to practice in the apparatus shown in FIG. 1B. No external source of energy participated in the reformation process.

| Reactant Composition (% Volume) | | | Product Composition (% Volume) | | | |
|---|---|---|---|---|---|---|
| $N_2$ | $O_2$ | $H_2S$ | $H_2$ | $N_2$ | $H_2S$ | $SO_2$ |
| 33.66 | 20.99 | 43.54 | 11.49 | 33.66 | 36.91 | 0.00 |
| 38.59 | 17.81 | 43.59 | 12.45 | 38.59 | 36.04 | 0.00 |
| 31.36 | 21.37 | 47.26 | 12.91 | 31.36 | 25.70 | 0.00 |

TABLE II-continued

Product composition from the reformation of a hydrogen sulfide containing stream with a relatively pure oxygen stream as the oxidizer inside a cyclic flow inert porous media reactor. The method was reduced to practice in the apparatus shown in FIG. 1B. No external source of energy participated in the reformation process.

| Reactant Composition (% Volume) | | | Product Composition (% Volume) | | | |
|---|---|---|---|---|---|---|
| $N_2$ | $O_2$ | $H_2S$ | $H_2$ | $N_2$ | $H_2S$ | $SO_2$ |
| 30.04 | 17.37 | 52.59 | 14.45 | 30.04 | 25.72 | 0.00 |
| 32.28 | 14.05 | 53.63 | 14.58 | 32.28 | 42.65 | 0.00 |
| 38.02 | 17.47 | 44.48 | 11.38 | 38.02 | 23.99 | 0.00 |
| 41.17 | 15.11 | 43.69 | 12.99 | 41.17 | 33.11 | 0.00 |
| 39.33 | 18.22 | 42.45 | 10.34 | 39.33 | 26.77 | 0.00 |
| 40.63 | 22.43 | 36.94 | 9.84 | 40.63 | 24.41 | 0.00 |
| 51.32 | 18.42 | 30.23 | 9.57 | 51.32 | 21.41 | 0.00 |

If the reactor chamber is sufficiently long to allow a residence time greater than about 0.25 seconds, sulfur will be virtually eliminated through reaction R4.

FIGS. 13A and 13B illustrate the temperature profile along the axial length of the cyclic flow reactor for hydrogen sulfide fuels with half-cycles of about fifteen minutes. In FIG. 13A, the equivalence ratio for the fuel and oxidizer reactant mixture was 3 while the equivalence ratio in FIG. 13B was 10 which yielded an overall lower temperature profile along the reactor. The sour gas stream contains about 50% $H_2S$ and about 50% $N_2$ with air as the oxidizer. The inert porous media matrix was about 40% porous and composed of randomly packed alumina pellets of about 3 millimeters in diameter. The room temperature gas velocity inside the porous media matrix was about 90 cm/s.

FIG. 14A illustrates the maximum temperature as a function of equivalence ratio in a cyclic flow reactor after many cycles. The sour gas stream contains about 50% $H_2S$ and about 50% $N_2$ with air as the oxidizer. FIG. 14B illustrates the maximum temperature at various equivalence ratios for a sour gas stream containing about 60% $H_2S$ and about 40% $N_2$ with air as the oxidizer. FIG. 14C further illustrates the concentrations of certain compounds in the product mixture stream after reformation of a dilute sour gas stream containing about 60% $H_2S$ and about 40% $N_2$ with air as the oxidizer as shown in FIG. 14B. FIG. 14D shows experimental and calculated equilibrium yield of hydrogen for the process conditions described in FIGS. 14B and 14C.

FIG. 15A shows the maximum temperature as a function of equivalence ratio for a cyclic flow reactor after many cycles. The sour gas stream contains about 50% $H_2S$ and about 50% $N_2$ with relatively pure oxygen as the oxidizer. The theoretical calculated adiabatic temperature is also shown for reference. FIG. 15B illustrates hydrogen yield as a function of equivalence ratio for a cyclic flow reactor after many cycles for a sour gas stream containing about 50% $H_2S$ and about 50% $N_2$ and with oxygen as the oxidizer for gas velocities of 90, 140, and 160 cm/s inside the reactor.

While the invention has been described, disclosed, illustrated, and shown in various terms of certain embodiments or modifications, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A cyclic flow reactor system comprising:
a reactor comprising a reactor casing and a reactor chamber, wherein the reactor chamber further comprises a first end and a second end,
wherein the reactor casing is constructed from a hard material;
wherein the reactor chamber is located substantially inside the reactor casing and wherein the reactor chamber extends substantially along an axial length of the reactor casing,
wherein the reactor chamber further comprises a substantially porous media matrix;
a piping network wherein at least a portion of the piping network is located on an exterior of the reactor casing, wherein the piping network further comprises at least one inlet pipe in connection with the first end of the reactor chamber and at least one outlet pipe in connection with the second end of the reactor chamber;
at least one first valve located adjacent to the inlet pipe and at least one second valve located adjacent to the outlet pipe;
a thermal insulation layer located substantially between the reactor casing and the reactor chamber, wherein the thermal insulation layer extends substantially along the axial length of the reactor casing, and wherein the thermal insulation layer forms a wall of the reactor chamber; and
at least one aperture along the axial length of the reactor casing to enable mounting of an external energy source, wherein the external energy source provides heat transfer to the thermal insulation layer and the reactor chamber comprising the substantially porous media matrix; and wherein
the external energy source mounted on the aperture comprises a burner providing oxidation of a hydrogen containing fuel with an oxygen containing gas, thereby adding fluid flow and chemical species directly to the thermal insulation layer and the reactor chamber comprising the substantially porous media matrix.

2. The system of claim 1 wherein the substantially porous media matrix comprises substantially randomly packed particles;
wherein the substantially porous media matrix comprises one or more selected from the group consisting of alumina, quartz, silicon carbide, silicon nitride and mixtures thereof.

3. The system of claim 1 wherein the substantially inert porous media matrix has a porosity of between about 5% and about 95%.

4. The system of claim 1 wherein the substantially porous media matrix comprises particles and wherein a substantial number of the particles have diameter equivalents between about 1 mm and about 100 mm.

5. The system of claim 1 further comprising at least one heat exchanger located adjacent to at least one of the group consisting of the inlet pipe, the outlet pipe and combinations thereof, wherein the at least one heat exchanger provides cooling fluid to the reactor system to facilitate heat transfer.

6. The system of claim 1 wherein the reactor is substantially U-shaped.

7. A cyclic flow reactor system comprising:
a reactor comprising a reactor casing and a reactor chamber, wherein the reactor chamber further comprises a first end and a second end,
wherein the reactor casing is constructed from a hard material;

wherein the reactor chamber is located substantially inside the reactor casing and wherein the reactor chamber extends substantially along an axial length of the reactor casing, wherein the reactor chamber further comprises a substantially porous media matrix;

a piping network wherein at least a portion of the piping network is located on an exterior of the reactor casing, wherein the piping network further comprises at least one inlet pipe in connection with the first end of the reactor chamber and at least one outlet pipe in connection with the second end of the reactor chamber;

at least one first valve located adjacent to the inlet pipe and at least one second valve located adjacent to the outlet pipe;

a thermal insulation layer located substantially between the reactor casing and the reactor chamber, wherein the thermal insulation layer extends substantially along the axial length of the reactor casing, and wherein the thermal insulation layer forms a wall of the reactor chamber; and at least one heat exchanger located adjacent to at least one of the group consisting of the inlet pipe, the outlet pipe and combinations thereof, wherein the at least one heat exchanger provides cooling fluid to the reactor system to facilitate heat transfer; and wherein the reactor casing comprises at least one aperture along the axial length of the reactor casing to enable mounting of an external energy source, wherein the external energy source provides heat transfer to the thermal insulation layer and the reactor chamber comprising the substantially porous media matrix and wherein the external energy source mounted on the aperture comprises a burner providing oxidation of a hydrogen containing fuel with an oxygen containing gas, thereby adding fluid flow and chemical species directly to the thermal insulation layer and the reactor chamber comprising the substantially porous media matrix.

8. The system of claim 7 wherein the substantially porous media matrix comprises substantially randomly packed particles;

wherein the substantially porous media matrix comprises one or more selected from the group consisting of alumina, quartz, silicon carbide, silicon nitride and mixtures thereof.

9. The system of claim 7 wherein the substantially porous media matrix has a porosity of between about 5% and about 95%.

10. The system of claim 7 wherein the substantially porous media matrix comprises particles and wherein a substantial number of the particles have diameter equivalents between about 1 mm and about 100 mm.

11. The system of claim 7 wherein the reactor is substantially U-shaped.

* * * * *